US010029572B2

(12) United States Patent
Sakatani et al.

(10) Patent No.: US 10,029,572 B2
(45) Date of Patent: Jul. 24, 2018

(54) POWER SOURCE SYSTEM FOR A VEHICLE

(71) Applicants: SANYO Electric Co., Ltd., Osaka (JP); Panasonic Corporation, Osaka (JP)

(72) Inventors: Toshihiro Sakatani, Aichi (JP); Hiromasa Sugii, Hyogo (JP); Makoto Ochi, Hyogo (JP); Kazuki Morita, Osaka (JP); Takumi Yamaguchi, Kyoto (JP); Yohsuke Mitani, Osaka (JP)

(73) Assignees: SANYO ELECTRIC CO., LTD., Osaka (JP); PANASONIC CORPORATION, Osaka (JP)

( * ) Notice: Subject to any disclaimer, the term of this patent is extended or adjusted under 35 U.S.C. 154(b) by 275 days.

(21) Appl. No.: 14/887,397

(22) Filed: Oct. 20, 2015

(65) Prior Publication Data
US 2017/0106758 A1 Apr. 20, 2017

Related U.S. Application Data

(63) Continuation of application No. PCT/JP2014/003797, filed on Jul. 17, 2014.

(30) Foreign Application Priority Data

Jul. 31, 2013 (JP) .................. 2013-159959

(51) Int. Cl.
*B60L 1/00* (2006.01)
*B60L 11/18* (2006.01)
*B60L 11/02* (2006.01)

(52) U.S. Cl.
CPC .............. *B60L 11/18* (2013.01); *B60L 11/02* (2013.01)

(58) Field of Classification Search
CPC .................. B60L 11/02; B60L 11/18

USPC ........................................ 307/10.1
See application file for complete search history.

(56) References Cited

U.S. PATENT DOCUMENTS

| 2015/0298557 | A1* | 10/2015 | Sakata | B60R 16/033 |
| | | | | 307/10.1 |
| 2015/0300307 | A1* | 10/2015 | Setterberg | F02N 11/087 |
| | | | | 701/113 |
| 2016/0144725 | A1* | 5/2016 | Nozawa | B60L 11/18 |
| | | | | 307/10.1 |

FOREIGN PATENT DOCUMENTS

| JP | 2006-029142 | 2/2006 |
| JP | 2009-255742 | 11/2009 |
| JP | 2011-167008 | 8/2011 |
| JP | 2012-100436 | 5/2012 |

OTHER PUBLICATIONS

International Search Report dated Sep. 9, 2014 in International (PCT) Application No. PCT/JP2014/003797.

* cited by examiner

*Primary Examiner* — Jared Fureman
*Assistant Examiner* — Duc M Pham
(74) *Attorney, Agent, or Firm* — Wenderoth, Lind & Ponack, L.L.P.

(57) ABSTRACT

A hybrid power source connects a secondary battery and an EDLC. A first switch connects the hybrid power source and a lead acid battery in parallel. A power source controlling portion controls power supply to the hybrid power source and the lead acid battery. The hybrid power source is connected to a starter for starting an engine for a vehicle, and also connected to an electric device except for the starter through the first switch, and the lead acid battery is connected to the electric device, and also connected to the starter through the first switch.

19 Claims, 25 Drawing Sheets

FIG. 3

| State | L1 | L2 | L3 | L7 |
|---|---|---|---|---|
| | 202 | 204 | 206 | 214 |
| Starting | ON | ON | OFF | OFF |
| Normal state (alternator on) | ON | ON | ON/OFF | OFF |
| Stopping (ignition on) | ON | ON | ON/OFF | OFF |
| Restarting | OFF | ON | ON/OFF | OFF |
| Restarting after failure of restart | ON | OFF | OFF | OFF |
| Stopping (ignition off) | OFF | OFF | OFF | ON |
| Normal state (secondary battery charging) | ON | OFF→ON | OFF | OFF |
| Normal state (EDLC charging) | ON/OFF | ON | ON/OFF→OFF | OFF |

| State | L1 | L2 | L3 | L4 | L7 |
|---|---|---|---|---|---|
| Starting | ON | OFF | OFF | OFF | OFF |
| Normal state (alternator on) | ON | ON | ON/OFF | ON | OFF |
| Stopping (ignition on) | ON | ON | ON/OFF | ON | OFF |
| Restarting | OFF | ON | ON/OFF | ON | OFF |
| Restarting after failure of restart | ON | OFF | OFF | OFF | OFF |
| Stopping (ignition off) | OFF | OFF | OFF | OFF | ON |
| Normal state (secondary battery charging) | ON | ON | OFF | ON | OFF |
| Normal state (EDLC charging) | ON/OFF | ON | ON/OFF→OFF | ON | OFF |

| State | L1 | L2 | L3 | L4 | L6 | L7 |
|---|---|---|---|---|---|---|
| Starting | OFF | OFF | OFF | OFF | ON | OFF |
| Normal state (alternator on) | ON | ON | ON/OFF | ON | OFF | OFF |
| Stopping (ignition on) | ON | ON | ON/OFF | ON | OFF | OFF |
| Restarting | OFF | ON | ON/OFF | ON | OFF | OFF |
| Restarting after failure of restart | OFF | OFF | OFF | OFF | ON | OFF |
| Stopping (ignition off) | ON | OFF | OFF | ON | OFF | ON |
| Normal state (secondary battery charging) | ON/OFF | ON | ON/OFF→OFF | ON | OFF | OFF |
| Normal state (EDLC charging) | | | | | | |

| State | L1 | L2 | L5 | L6 |
|---|---|---|---|---|
| Starting | OFF | OFF | OFF | ON |
| Normal state (alternator on) | ON | ON | ON | OFF |
| Stopping (ignition on) | ON | ON | ON | OFF |
| Restarting | OFF | ON | ON | OFF |
| Restarting after failure of restart | OFF | OFF | OFF | ON |
| Stopping (ignition off) | OFF | OFF | OFF | OFF |
| Normal state (secondary battery charging) | ON | ON | ON | OFF |
| Normal state (EDLC charging) | ON/OFF | ON | ON | OFF |

114

POWER SOURCE SYSTEM FOR A VEHICLE

TECHNICAL FIELD

The present invention is related to power source technology, especially, a power source system for a vehicle installed in the vehicle.

BACKGROUND ART

An engine installed in the vehicle is started by a starter. Power for driving the starter is supplied from a battery installed in the vehicle. In a case where a voltage of the battery largely drops at the time of activating the starter, an operation of the starter is influenced (for example, refer to patent literature 1).

CITATION LIST

Patent Literature

Patent Literature 1: Japanese Laid-Open Patent Publication No. 2009-255742

SUMMARY OF THE INVENTION

A lead acid battery is generally used as the storage battery for the idle (idling) stop system or the regenerative power generation system. The vehicle having such a system can reduce fuel consumption by the alternator operation, and can improve fuel efficiency since the idle stop is carried out during stopping. In order to further reduce the fuel consumption, stopping the engine is being considered or developed during not only stopping the vehicle but also driving. In this case, it is required to surely restart the engine when re-acceleration becomes necessary due to a road condition or risk avoidance.

The present disclosure is developed for the purpose of solving such requirements. One non-limiting and explanatory embodiment provides a power source system for a vehicle having high reliability.

A power source system for a vehicle of the present disclosure includes: a lead acid battery; a hybrid power source connecting a secondary battery except for the lead acid battery and a capacitor; a switch between power sources connecting the hybrid power source and the lead acid battery in parallel; and a power source controlling portion for controlling power supply to the hybrid power source and the lead acid battery. The hybrid power source is connected to a starter for starting an engine for the vehicle, and also connected to a general load except for the starter through the switch between the power sources, and the lead acid battery is connected to the general load, and also connected to the starter through the switch between the power sources.

In the present disclosure, a power source system for a vehicle having high reliability can be provided.

BRIEF DESCRIPTION OF DRAWINGS

FIG. 3 is a figure showing data structure in a table stored in a power source controlling portion of FIG. 1.
FIG. 9 is a figure showing data structure in a table stored in a power source controlling portion of FIG. 8.
FIG. 15 is a figure showing data structure in a table stored in a power source controlling portion of FIG. 14.
FIG. 21 is a figure showing data structure in a table stored in a power source controlling portion of FIG. 20.

Figure 1:
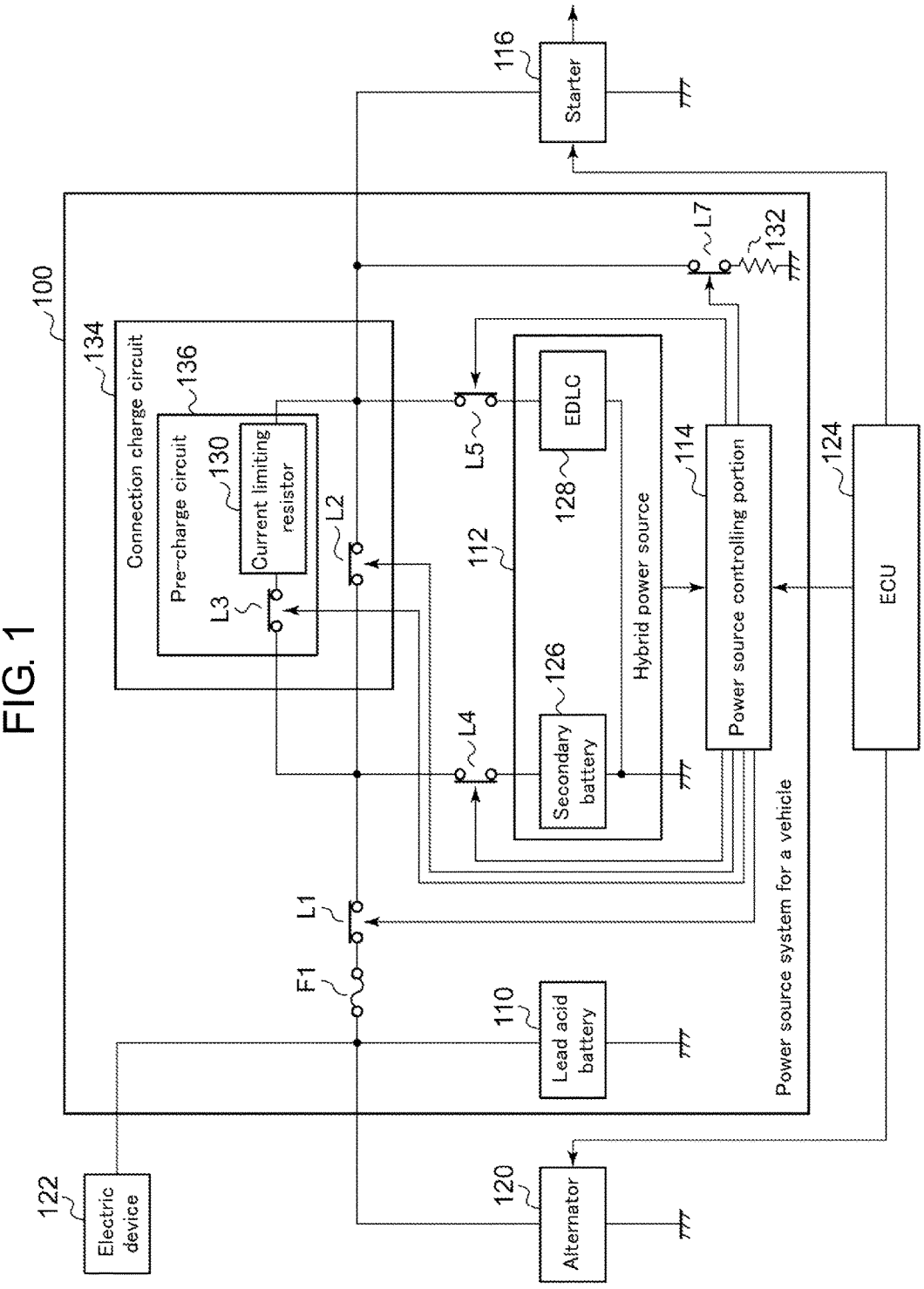
FIG. 1 is a circuit diagram showing configuration of a power source system for a vehicle related to an embodiment 1 of the present invention.

DESCRIPTION OF EMBODIMENTS (Embodiment 1)
Before the embodiment of the present invention is concretely explained, its outline is explained. The embodiment 1 relates to a power source system installed in a vehicle which has the idle (idling) stop function and the regenerative power generation function. The idle (idling) stop function is a function in which the engine is automatically stopped at the time of stopping the vehicle and the engine is automatically restarted at the time of restarting the vehicle. The regenerative power generation function is a function in which the alternator is operated by kinetic energy of the vehicle mainly at deceleration and power generated by the alternator is supplied to the power source system for the vehicle. As the alternator is also stopped at the time of stopping the vehicle in the idle stop function, fuel efficiency can be improved.

The lead acid battery is widely used in the power source system for the vehicle. When the lead acid battery reaches the discharge minimum voltage by discharge, the lead acid battery is charged by making the alternator operate. Thus, deepening the discharge depth of the lead acid battery is reduced, and the degradation of the lead acid battery can be reduced. However, such controlling makes time of the idle stop short, and then makes the effect of the improvement in fuel efficiency small. Further, it is being considered that stopping the engine is carried out even during the vehicle driving in addition to the time of stopping the vehicle. In this case, it is required to surely restart the engine when re-acceleration becomes necessary due to a road condition or risk avoidance. The active material is removed in the lead acid battery as degradation proceeds, and the internal short circuit might occur suddenly in some cases. Since it is difficult to detect this occurrence in advance, it becomes difficult to maintain the performance of restarting the engine by the lead acid battery.

In consideration of these circumstances, in the power source system for the vehicle of the embodiment, the lead acid battery and the hybrid power source are connected in parallel. Further, as the hybrid power source, the secondary battery and the capacitor are connected in parallel. Here, as the secondary battery, the nickel hydride battery or the lithium ion battery is used. The separation device is disposed between the lead acid battery and the hybrid power source, and then the lead acid battery and the hybrid power source are configured to be separable. In the normal state at the operation of the engine, the lead acid battery and the hybrid power source are connected, and then load of the lead acid battery can be reduced, and the degradation can be suppressed. In contrast, in the restart of the engine, the lead acid battery and the hybrid power source are separated by the separation device, and the lead acid battery supplies power to the electric device except for the starter, and the hybrid power source supplies power to the starter. As the result, reliability of the restart of the engine is improved.

FIG. 1 shows a configuration of power source system for a vehicle 100 related to the embodiment 1 of the present invention. Power source system 100 for the vehicle includes lead acid battery 110, hybrid power source 112, power source controlling portion 114, connection change circuit 134, discharge resistor 132, first switch L1, fourth switch L4, fifth switch L5, seventh switch L7, and first fuse F1. Hybrid power source 112 includes secondary battery 126 and EDLC (Electric Double-Layer Capacitor) 128. Connection change circuit 134 includes pre-charge circuit 136 and second switch L2. Pre-charge circuit 136 includes third switch L3 and current limiting resistor 130. Power source system 100 is connected to starter 116, alternator 120, electric device 122, and ECU 124. First switch L1 is referred to as the switch between the power sources, and second switch L2 is referred to as the switch inside the power source, and third switch L3 is referred to as the pre-charge switch, and fourth switch L4 is referred to as the secondary battery connection switch, and fifth switch L5 is referred to as the capacitor switch, and seventh switch L7 is referred to as the discharge switch.

Alternator 120 generates alternating current power by an engine not shown, and further power is also generated by kinetic energy of the vehicle at deceleration in the vehicle having the regenerative power generation function. Here, power generation at deceleration is mainly described. The timing of the operation of alternator 120 is instructed by ECU 124 mentioned below. Alternating current power generated by alternator 120 is converted to direct current power through a circuit including a regulator, a rectifier not shown, and the like. Power of alternator 120 is supplied to electric device 122, power source system 100.

Starter 116 is a motor for stating the engine. Starter 116 is connected to the output of power source system 100. In a case where an ignition switch not shown is turned on by controlling of the driver, or a state recovers from the state of the idle stop, a starter switch (not shown) is turned on by the instruction from ECU 124, and power is supplied from power source system 100 to starter 116, and then starter 116 starts. Once the engine starts by starter 116, the starter switch is turned off.

Electric device 122 is a general term indicating many kinds of electric loads installed in the vehicle, such as, a headlight, an air-conditioner, a defogger, an audio, a meter, a stop lamp, a fog lamp, a blinker, a power steering, an automatic window, an engine electric device, or the like. Here, for convenience of explanation, alternator 120, starter 116, and ECU 124 is treated separately from electric device 122. Electric device 122 is actuated by power supplied from power source system 100.

ECU 124 is connected to many types of auxiliaries, sensors, and switches, and electrically controls the engine and many types of the auxiliaries. In a case of carrying out the idle stop function, ECU 124 stops the engine when ECU 124 detects stopping of the vehicle, or deceleration to the preset speed or less based on signals inputted from brakes, speed sensors, or the like. Then, ECU 124 determines starting of the vehicle driving by detecting brake release. ECU 124 makes the engine restarted by detecting the start of the vehicle driving after the engine is stopped by carrying out the idle stop function. At this time, power source controlling portion 114 of power source system 100 controls such that power is supplied from power source system 100 to starter 116, and the starter 116 is operated. Here, as mentioned above, ECU 124 determines starting of the vehicle driving by detecting brake release. However, the present invention is not necessarily limited to this configuration. For example, the start of the vehicle driving can be determined based on the speed sensor, or a state of an accelerator.

Additionally, ECU 124 may stop the engine in a case where predetermined condition is satisfied even during the vehicle driving. For example, the predetermined condition is set such that the deceleration continues over a period of time, or the speed does not charge over a period of time. When a necessity of acceleration by pressing the accelerator is detected after stopping the engine under such a condition, the engine is restarted as mentioned above. But, ECU 124 stops alternator 120 in principle at the normal driving. At the time of carrying out an energy regenerative function, ECU 124 operates alternator 120 when detecting the deceleration of the vehicle based on the signals input from the brakes, the speed sensors, or the like. ECU 124 operates alternator 120 even at the normal driving in a case where storage energy of power source system 100 is less than a preset minimum value.

In power source system 100, lead acid battery 110 stores power generated from alternator 120, and is a main battery for supplying power to electric device 122. Lead acid battery 110 has merits of, such as, being comparatively inexpensive, being operable in comparatively wide temperature range, being high output, and then is widely used as a storage battery for the vehicle. But, it has demerits of, such as, comparatively low efficiency in charge and discharge energy, being weak in over-discharge, being short in cycle life. Lead acid battery 110 is connected to electric device 122, and also is connected to starter 116 through first fuse F1, first switch L1, second switch L2. Hereinafter, in order to clearly explain, explanation of first fuse F1 is omitted. Here, the capacity of lead acid battery 110 is larger than that of secondary battery 126 mentioned below.

Secondary battery 126 as a sub-battery stores power generated by alternator 120, and supplies power to starter 116 and electric device 122. Secondary battery 126 is connected in parallel to EDLC 128 mentioned below through fourth switch L4, second switch L2, and fifth switch L5, and such a structure configures hybrid power source 112. Further, hybrid power source 112 and lead acid battery 110 are connected in parallel through first switch L1. Secondary battery 126 has more excellent charge acceptability than that of lead storage batter 110, and one example is a nickel hydride battery.

The nickel hydride battery has merits of, such as, comparatively high efficiency in charge and discharge energy, being strong against over-charge and over-discharge, being wide in operating temperature range, being wide in operating SOC (State Of Charge), having comparative long cycle life, or the like. Further, the nickel hydride battery has low degradation and deep recommended depth of discharge (DOD: Depth Of Discharge) in which discharge can be used until deep range of depth of discharge. However, it has demerits of, such as, being large in self-discharge, having memory effect, or the like. Secondary battery 126 is connected to starter 116 through fourth switch L4 and second switch L2, and also is connected to electric device 122 through fourth switch L4 and first switch L1. Here, one end of fourth switch L4 is connected to secondary battery 126, and another end of fourth switch L4 is connected to starter 116, first switch L1 and second switch L2.

EDLC 128 is a capacitor, and electric double-layer capacitor having high charge storage efficiency per unit volume is preferable for EDLC 128. In a case of building a general 12V-type system, for example, secondary battery 1 where a plurality of the 1.2 V nickel hydride batteries are connected in series, and EDLC 128 where a plurality of the electric double-layer capacitors having rated voltage of 2.0V, can be used. Here, EDLC 128 is connected to starter 116 through fifth switch L5, and also is connected to electric device 122 through second switch L2 and first switch L1. One end of fifth switch L5 is connected to EDLC 128, and another end of fifth switch L5 is connected to starter 116 and second switch L2. Hybrid power source 112 is connected to alternator 120 which generates electricity from mechanical kinetic energy of the vehicle, through first switch L1.

In a case where idle stop function is adopted, since the usage number of starter 116 is increased, it is necessary to increase a capacity of the storage battery. At this time, simply the capacity of the lead acid battery is not increased, but combination of plural types of the storage batteries having different properties can be used. Then, the capacity of the whole storage battery can be increased, while it compensates demerit of each storage battery. Here, combination of lead acid battery 110 and hybrid power source 112 is used. As hybrid power source 112, only EDLC 128 has been used. In order to prevent EDLC 128 from being degraded, it is desirable that EDLC 128 should be discharged to a preset voltage or less which enables prevention of degradation. When lead acid battery 110 and EDLC 128 are combined, EDLC 128 is charged by lead acid battery 110, and then EDLC 128 is used. Therefore, decrease in the number of charge or discharge in lead acid battery 110 is small.

To respond to this, in hybrid power source 112, in addition to EDLC 128, secondary battery 126 is combined. As secondary battery 126 is used for charging EDLC 128, the number of use of lead acid battery 110 is widely decreased. Further, as dependence on lead acid battery 110 is decreased, the reliability is improved. As mentioned above, the nickel hydride battery is used as secondary battery 126, but a lithium ion battery may be used. The lithium ion battery has high energy density and high efficiency in charge and discharge energy, and shows high performance, but it is necessary to rigidly control voltage and temperature.

Generally, the storage battery is installed in an engine room. The nickel hydride battery is more suitable for installing in the engine room together with the lead acid battery than the lithium ion battery. The temperature in the engine room is increased at a time of the engine operation, but the nickel hydride battery has more heat stability than that of the lithium ion battery. In a case where the lithium ion battery connected in parallel to lead acid battery 110 is installed at the position away from the engine room, loss by wiring resistance is increased.

In power source system 100, first switch L1 is disposed at a path for connecting hybrid power source 112 and lead acid battery 110 in parallel. When first switch L1 is in the ON state, lead acid battery 110 and hybrid power source 112 are connected in parallel. In contrast, when first switch L1 is in the OFF state, lead acid battery 110 and hybrid power source 112 are electrically separated. The ON/OFF control of first switch L1 is carried out by power source controlling portion 114 described below.

When first switch L1 is in the ON state, lead acid battery 110 and hybrid power source 112 are capable of supplying power to a plurality of the loads in the vehicle. When first switch L1 is in the OFF state, they are capable of independently supplying power to different loads each other in the plurality of the loads. Concretely, when first switch L1 is in the OFF state, lead acid battery 110 is capable of supplying power to electric device 122. When first switch L1 is in the OFF state, hybrid power source 112 is capable of supplying power to starter 116.

Power source controlling portion 114 controls power supply of hybrid power source 112 and lead acid battery 110, and also carries out the ON/OFF control of first switch L1 to fifth switch L5, and seventh switch L7. For example, power source controlling portion 114 obtains voltage values, current values, and temperature values of secondary battery 126 and EDLC 128, and monitors the remaining capacity and the presence or absence of the abnormal state occurrence in secondary battery 126, and voltage and the presence or absence of the abnormal state occurrence in EDLC 128. Power source controlling portion 114 and ECU 124 are connected through, for example, CAN (Controller Area Network), and they are communicated. Power controlling portion 114 notifies ECU 124 of states in secondary battery 126 and EDLC 128. For example, the normal state/the abnormal state, the remaining capacity (SOC: State OF Charge), and voltage are notified. Additionally, when the remaining capacity of secondary battery 126 or voltage of EDLC is decreased less than predetermined minimum values, power source controlling portion 114 notifies ECU 124 of operation instruction of alternator 120. Power source controlling portion 114 receives vehicle information from ECU 124. For example, it receives operating status of alternator 120.

In connection change circuit 134, relays or semiconductor switches are used for second switch L2 or third switch L3. Second switch L2 is inserted in the power line connecting the input/output terminal of secondary battery 126 and the input/output terminal of EDLC 128. When second switch L2 is turned on, secondary battery 126 and EDLC 128 are connected in parallel. Current limiting resistor 130 and third switch L3 by connecting them in series configure pre-charge circuit 136, and also are connected in parallel to second switch L2. When third switch L3 is turned on, secondary battery 126 and EDLC 128 are connected in parallel.

One end of seventh switch L7 is connected in parallel to EDLC 128 through fifth switch L5. The other end of seventh switch L7 is connected to discharge resistor 132. Discharge resistor 132 is, for example, a heater resistor. This discharge resistor 132 is used for discharging EDLC 128. Then, when seventh switch L7 is turned on, EDLC 128 is discharged. Second switch L2, third switch L3, and seventh switch L7 are also controlled by power source controlling portion 114.

Figure 2:
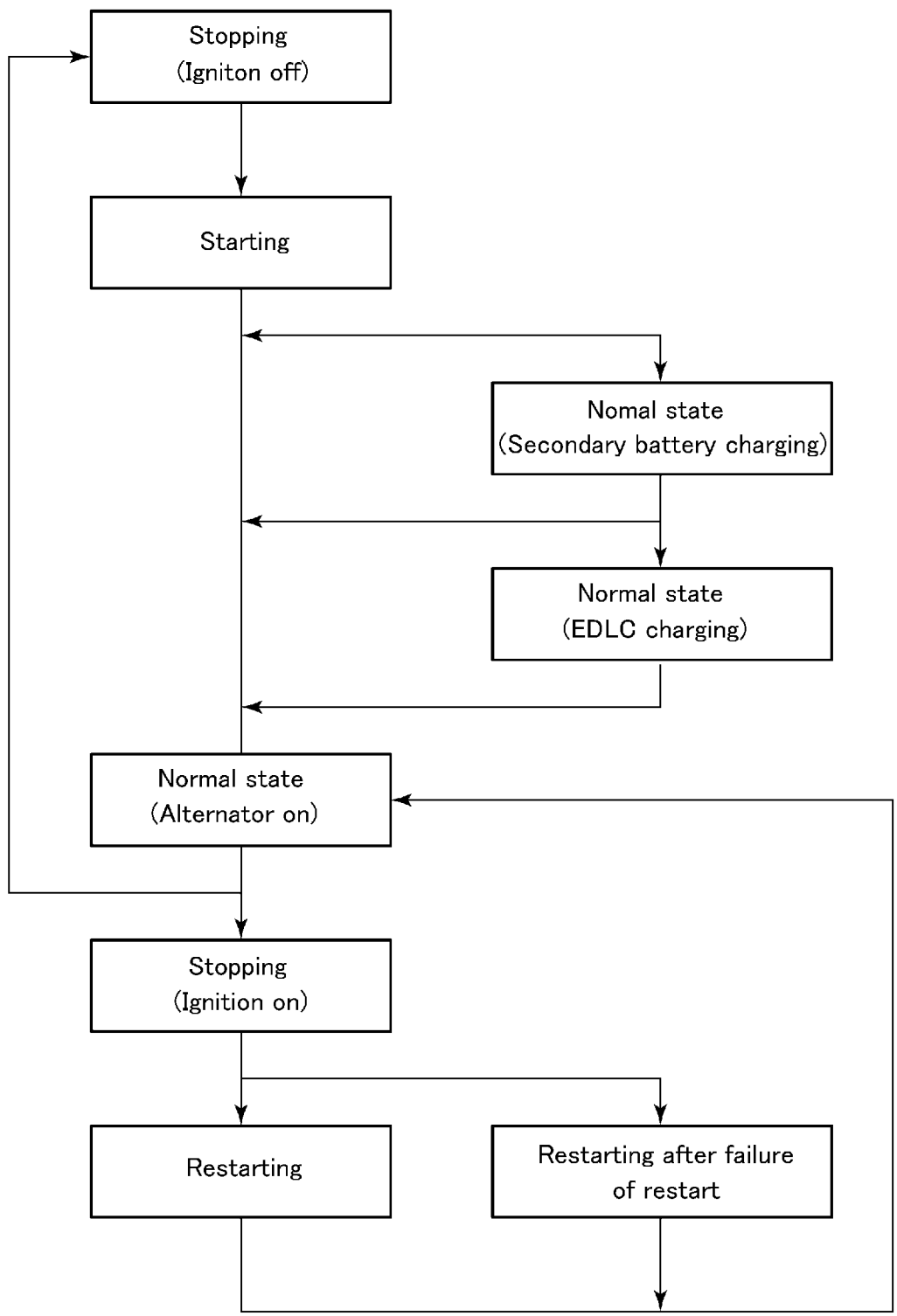
FIG. 2 is a figure showing state transition of the power source system for the vehicle of FIG. 1.

The control of power source system 100 by power source controlling portion 114 is explained below. FIG. 2 is a figure showing state transition of power source system 100. "Stopping (ignition off)" is a state where the engine is stopped by turning off the ignition switch. "Starting" is a state where the engine is started by turning on the ignition switch from the state where the engine is stopped by turning off the ignition switch. "Normal state (the secondary battery charging)" is a state where alternator 120 charges secondary battery 126. "Normal state (the EDLC charging)" is a state where the secondary battery charges the EDLC. Here, "Normal state (the secondary battery charging)" or "Normal state (the EDLC charging)" may be skipped depending on the remaining capacities of secondary battery 126 or EDLC 128. "Normal state (alternator on)" is a state where the engine is operating. "Stopping (ignition on)" is a state where the engine is stopped. This includes the idle stop or the engine stop during driving. "Restarting" is a state where the engine is restarted from the state of the engine stop at the idle stop or the engine stop during driving. "Restart after failure of restart" is a state where the engine is restarted again after the restart by hybrid power source 112 is failed, or a state where the engine is restarted when hybrid power source 112 is abnormal, for example, the voltage of secondary battery 126 or EDLC 128 is lower than a threshold.

The vehicle state is detected by ECU 124, and ECU 124 outputs the signal indicating the detected state to power source controlling portion 114. In the detection of the vehicle state by ECU 124, the public known technology is used, and then its explanation is omitted. The power source controlling portion 114 recognizes states based on the signals from ECU 124.

The switch control corresponding to each state is explained. FIG. 3 shows data structure in a table stored in power source controlling portion 114. As shown in the figure, the figure includes state column 200, L1 column 202, L2 column 204, L3 column 206, and L7 column 214. The states shown in state column 200 are explained above. L1 column 202 to L3 column 206, and L7 column 214 show selected connecting states of first switch L1 to third switch L3, and seventh switch L7 corresponding to the states. Power source controlling portion 114 specifies the connecting state of first switch L1 to third switch L3, and seventh switch L7 corresponding to the recognized states by referring to the table.

Figure 4:
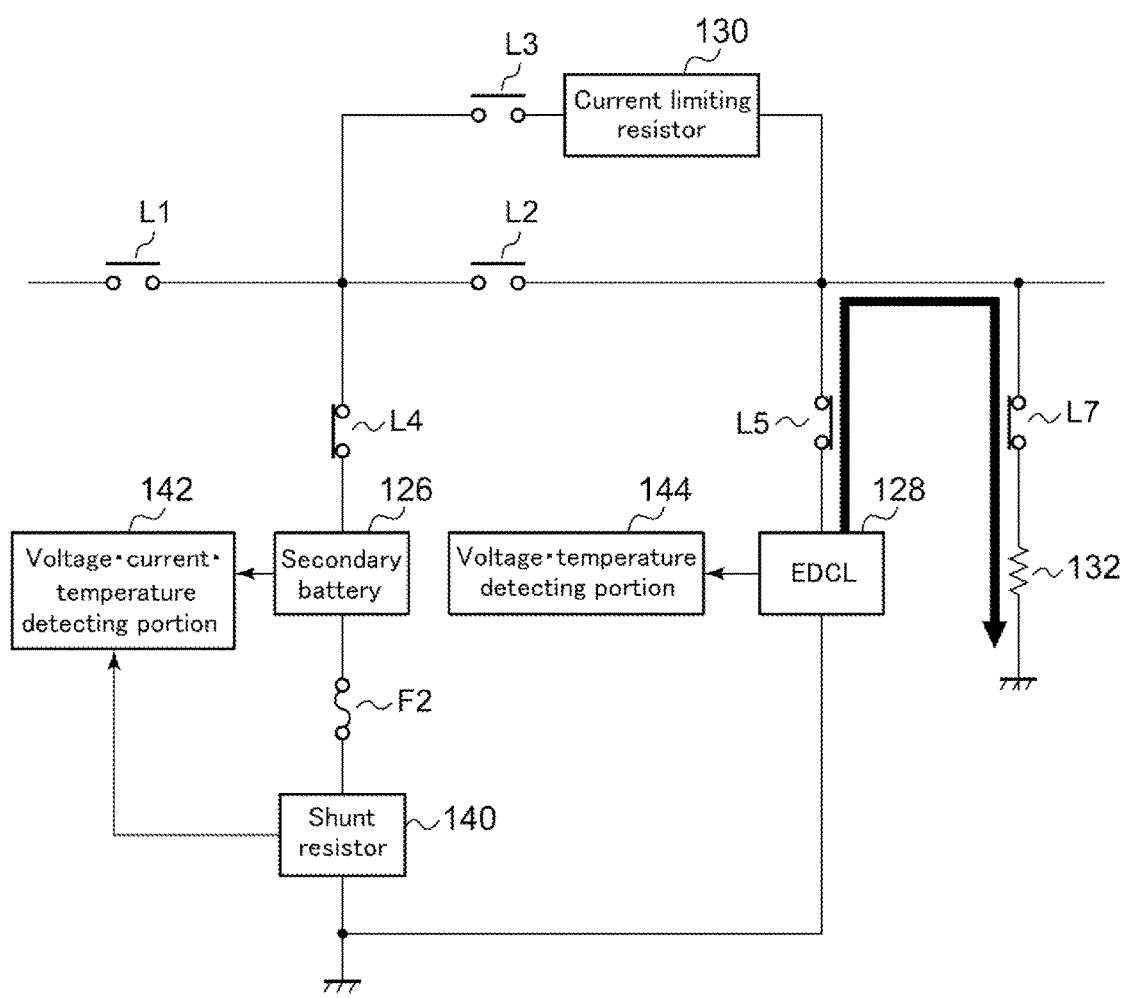
FIG. 4 is a circuit diagram showing connecting state at the time of stopping (ignition off) in the power source system for the vehicle of FIG. 1.

FIG. 4 shows the connecting state at the time of stopping (ignition off) in power source system 100. In addition to FIG. 1, FIG. 4 includes shunt resistor 140, voltage• current• temperature detecting portion 142, voltage• temperature detecting portion 144, and second fuse F2. The public known technology is used for this configuration, and then its explanation is omitted. Voltage• current• temperature detecting portion 142, or voltage• temperature detecting portion 144 outputs detected result to power source controlling portion 114 or ECU 124. Further, in order to simplify the figure, signal lines from power source controlling portion 114 to each switch are omitted.

As the engine is stopped at the time of stop (ignition off), it is preferable that EDLC 128 is compulsorily discharged to about zero volt of EDLC 128 to prevent degradation of EDLC 128. Concretely, when the engine of the vehicle is stopped by the ignition off, power source controlling portion 114 turns off first switch L1, second switch L2, and third switch L3, and turns on fifth switch L5 and seventh switch L7, and compulsorily discharges EDLC 128. Thus, as EDLC 128 has no charge at the time of stop (ignition off), it is required that power source controlling portion 114 charges EDLC 128 to a full charge at the time of starting. Therefore, power source controlling portion 114 controls the current limiting mode for limiting parallel current between secondary battery 126 and EDLC 128, and the large current mode for allowing larger parallel current than that of the current limiting mode.

Power source controlling portion 114 controls connection change circuit 134, and selects either the current limiting mode or the large current mode. Here, before starting, power source controlling portion 114 switches connection change circuit 134 to the current limiting mode. Concretely, power source controlling portion 114 turns off second switch L2, and also turns on third switch L3. Thus, by switching pre-charge circuit 136 to the ON state, secondary battery 126 and EDLC 128 are connected in parallel through current limiting resistor 130, and EDLC 128 is charged by secondary battery 126. Further, when the voltage of EDLC 128 becomes a voltage near the full charge, the mode is shifted from the current limiting mode to the large current mode. Power source controlling portion 114 turns on second switch L2, and also turns off or on third switch L3. Pre-charge circuit 136 is switched to the ON or OFF state. Then, EDLC 128 is charged to the full charge. Thus, power source controlling portion 114 selects the current limiting mode of the large current mode corresponding to the charged voltage of secondary battery 126 and the charged voltage of EDLC 128, and then EDLC 128 is charged by the charged energy of secondary battery 126. Concretely, when the charged voltage is more than a threshold, the large current mode is selected, or when the charged voltage is a threshold or less, the current limiting mode is selected. When EDLC 128 is at the full charge, the voltage of EDLC 128 is equal to the voltage of secondary battery 126. Pre-charge circuit 136 is a means for limiting charging current from secondary battery 126 to EDLC 128. Thus, as EDLC 128 having a decreased voltage is charged by secondary battery 126 through the means for limiting charging current, it is prevented that secondary battery 126 cannot supply charging current since an electrical potential difference between both ends of secondary battery 126 is decreased by a large current flowing through secondary battery 126.

When the engine is started at the time of starting, power source controlling portion 114 selects the current limiting mode or the large current mode corresponding to the charged voltage of secondary battery 126 and the charged voltage of EDLC 128, and then EDLC 128 is charged by the charged energy of secondary battery 126.

Figure 5:
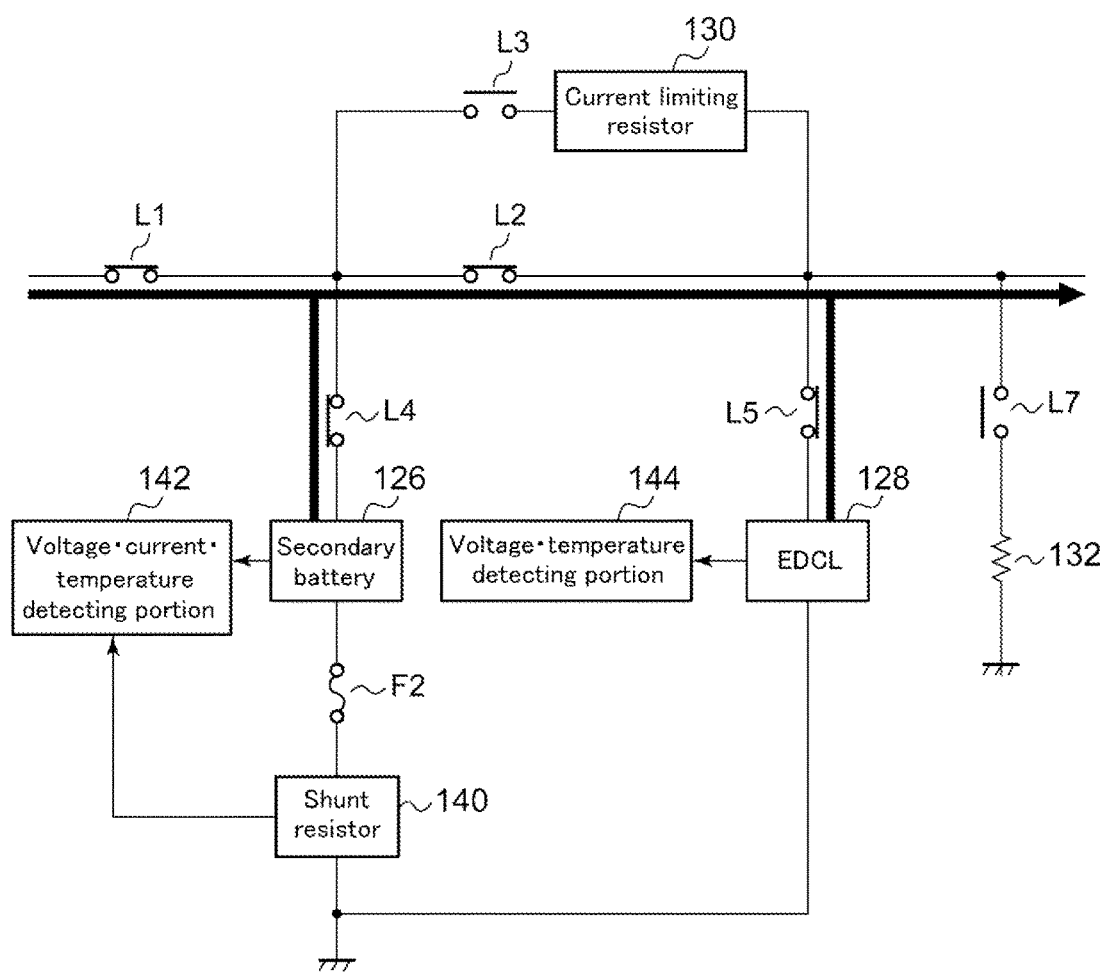
FIG. 5 is a circuit diagram showing connecting state at the time of restarting, after failure of starting or restarting in the power source system for the vehicle of FIG. 1.

FIG. 5 shows connecting state at the time of starting, or restarting after failure of restarting in power source system 100. FIG. 5 is shown in the same way as FIG. 4. According to the table shown in FIG. 3, first switch L1, second switch L2, fourth switch L4, and fifth switch L5 are turned on. Further, seventh switch L7 is turned off. As a result, power is supplied from lead acid battery 110 and secondary battery 126 to starter 116 through second switch L2, and also power is supplied from EDLC 128 to starter 116. Here, in a case where power supply from secondary battery 126 is stopped, fourth switch L4 is turned off. In a case where power supply from EDLC 128 is stopped, fifth switch L5 is turned off.

In the above explanation, fourth switch L4 and fifth switch L5 are continuously in the ON state. However, it happens that fourth switch L4 and/or fifth switch L5 are turned off at the time of starting, or restarting after failure of restarting. Here, the control of fourth switch L4 is explained. It is considered that the trouble in which the engine cannot be restarted in the hybrid power source is due to the inner short in the secondary battery 126. As the voltage of secondary battery 126 having the internal short is lower than the voltage of lead acid battery 110, when lead acid battery 110 and secondary battery 126 are connected in this state, there is a danger that power supply to starter 116 is insufficient by current flowing from lead acid battery 110 to secondary battery 126. In addition, under low-temperature environments, when power is supplied from secondary batter 126 to starter 116, voltage decrease becomes large, and then there is a danger that polarity reversal occurs or the battery is degraded due to irreversible side reaction.

In order to respond to this, in a case where the voltage difference between secondary battery 126 and lead acid battery 110 is a preset value or more, or the environmental temperature is less than a preset value, power source controlling portion 114 turns off fourth switch L4 at the time of starting, or restarting after failure of restarting. Otherwise, power source controlling portion 114 turns on fourth switch L4. In the same way, in a case where the charge of EDLC 128 is insufficient, power source controlling portion 114 turns off fifth switch L5. As mentioned above, power source controlling portion 114 controls such that power is preferentially supplied from lead acid battery 110 to starter 116, in a case where a restart of the engine is not done by hybrid power source 112 at the time of restarting the engine, or the engine is started by the ignition on.

Figure 6:
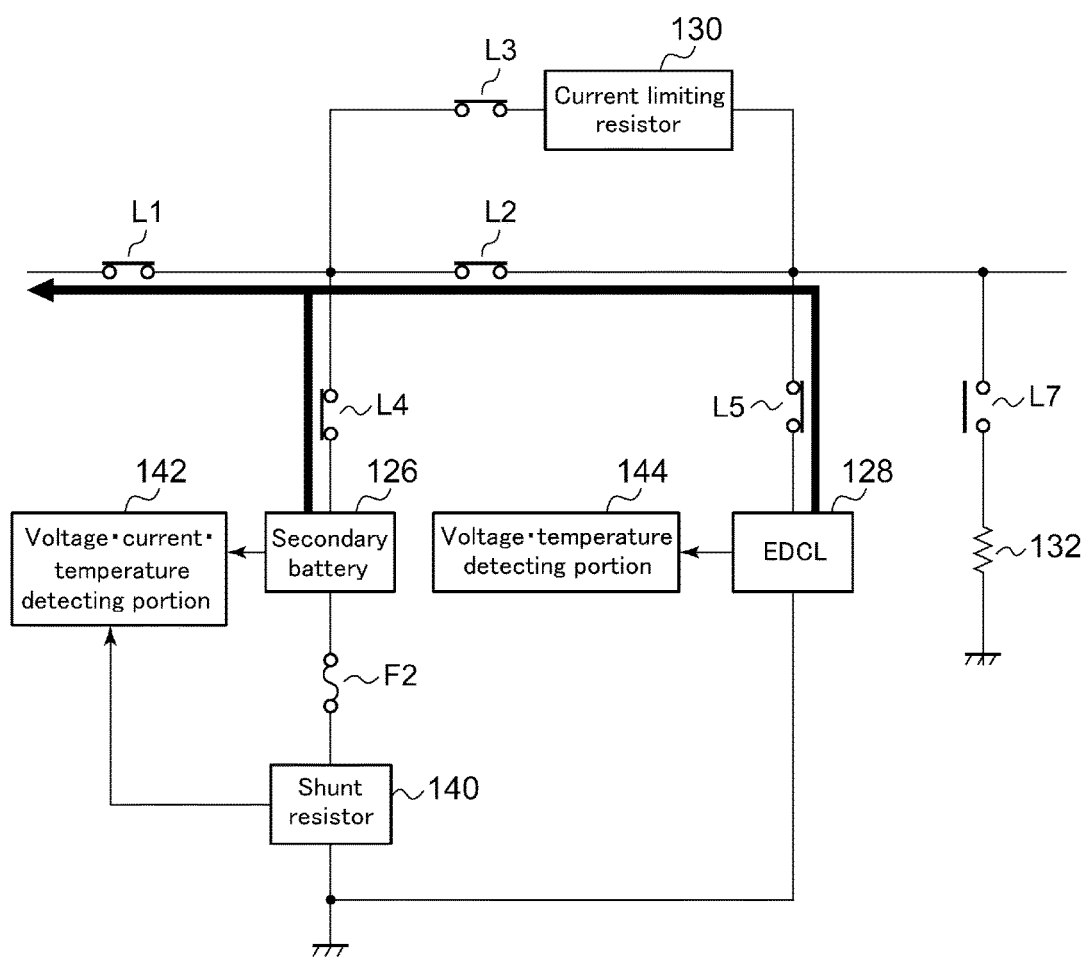
FIG. 6 is a circuit diagram showing connecting state at the normal time (alternator on) or the stopping time (ignition on) in the power source system for the vehicle of FIG. 1.

FIG. 6 shows connecting state at the normal time (alternator on) or the stopping time (ignition on) in power source system 100. FIG. 6 is also shown in the same way as FIG. 4. According to the table shown in FIG. 3, first switch L1, second switch L2, fourth switch L4, and fifth switch L5 are turned on. Further, seventh switch L7 is turned off. As a result, power is supplied from lead acid battery 110 to electric device 122. Power is supplied from secondary battery 126 to electric device 122 through fourth switch L4 and first switch L1, and also power is supplied from EDLC 128 to electric device 122 through fifth switch L5, second switch L2, and first switch L1. Here, power source controlling portion 114 makes secondary battery 126 charged with power generated from alternator 120 by turning on first switch L1.

Figure 7:
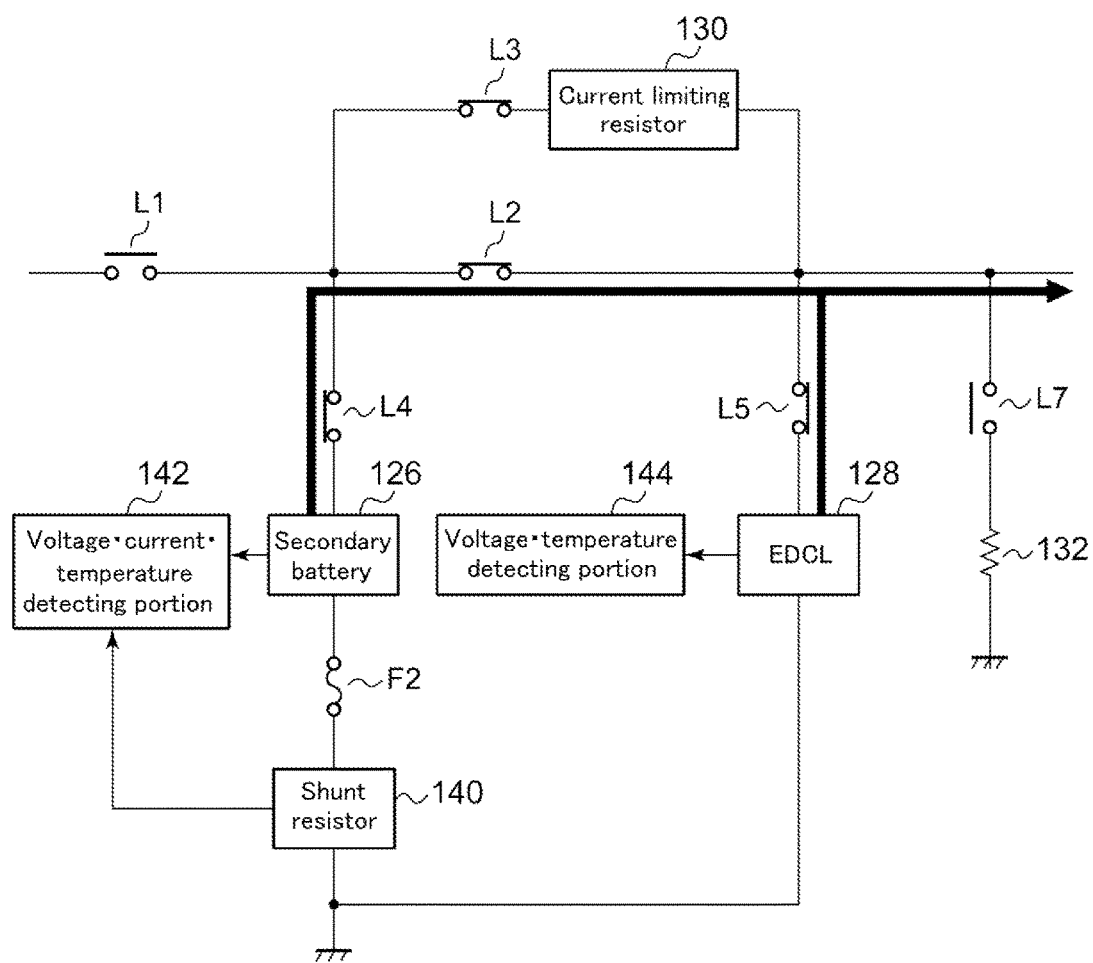
FIG. 7 is a circuit diagram showing connecting state at the time of restarting in the power source system for the vehicle of FIG. 1.

FIG. 7 shows connecting state at the time of restarting in power source system 100. FIG. 7 is also shown in the same way as FIG. 4. According to the table shown in FIG. 3, first switch L1 is turned off, and second switch L2, fourth switch L4, and fifth switch L5 are turned on. Further, seventh switch L7 is turned off. As a result, power is supplied from secondary battery 126 to starter 116 through fourth switch L4 and second switch L2, and also power is supplied from EDLC 128 to starter 116 through switch 5.

Although this configuration can be realized in terms of hardware, by an arbitrary processor or memory or any other type of LSI and are realized, in terms of software, by, for example, a program loaded into a memory, depicted herein are functional blocks that are realized by such hardware and software used in a coordinated manner. It is therefore understandable to those skilled in the art that these functional blocks can be realized in various forms by hardware alone, software alone, or the combination of hardware and software.

In the embodiment of the present invention, according to the operation states of the switch between the power sources, the lead acid battery and the hybrid power source can be used appropriately. As the hybrid power source supplies power to the starter, the power source system for the vehicle having high reliability can be provided. Further, current consumption of the starter is larger than that of a general load, and whether or not the lead acid battery is used for starting the starter can be selected corresponding to the circumstance or the state. Thus, since whether or not the lead acid battery is used for starting the starter can be selected corresponding to the circumstance or the state, current amount from the lead acid battery can be reduced. When EDLC 128 is recharged, the secondary battery is used, and then power consumption of the lead acid battery can be reduced.

As the lead acid battery is connected to the general load in a state where the lead acid battery is separated from the starter, power having stable voltage can be supplied to the general load. At restarting, the lead acid battery is not used for starting the starter, and then decrease in the life of the lead acid battery can be reduced. Further, whether or not power supply from only the hybrid power source enables the starter to start, depends on the temperature. When the temperature is too low, it is considered that restarting is impossible. Therefore, as it is possible that power is supplied from the lead acid battery to the starter, the redundancy or the flexibility can be obtained. Especially, when the hybrid power source cannot make the starter start, the starter starts by the lead acid battery.

Further, as the EDLC is connected to the starter directly, energy loss can be reduced. As energy loss is reduced, the engine can be started highly efficiently at restarting. Further, as a separation device between the EDLC and the secondary battery in the hybrid power source is provided, The EDLC is left in a discharged state, and then its degradation can be reduce. Further, in the current limiting mode, the switch inside the power source is turned off, and also the pre-charge switch is turned on, and then the EDLC can be pre-charged. Additionally, corresponding to the charged voltage of the secondary battery and the charged voltage of the capacitor, the current limiting mode or the large current mode is selected, and then current amount can be adjusted according to the circumstance or the state. Further, as the EDLC is discharged compulsorily when the vehicle is not used, degradation of the EDLC can be reduced. Further, charging current is collected by the lead acid battery and the hybrid power source, and then power generated by the alternator can be collected efficiently.

(Embodiment 2)

Next, the embodiment 2 of the present invention is explained. The embodiment 2 is related to the power source system for the vehicle where the lead acid battery, the secondary battery, and the EDLC are connected in parallel in the same way as the embodiment 1. In the power source system for the vehicle in the embodiment 1, the secondary battery is connected to the starter through the second switch, but in the power source system for the vehicle in the embodiment 2, the secondary battery is connected to the starter without through the second switch. Loss is decreased when power is supplied from the secondary battery to the starter since those are connected without through the second switch. Mainly, the difference from the embodiment 1 is explained below.

Figure 8:
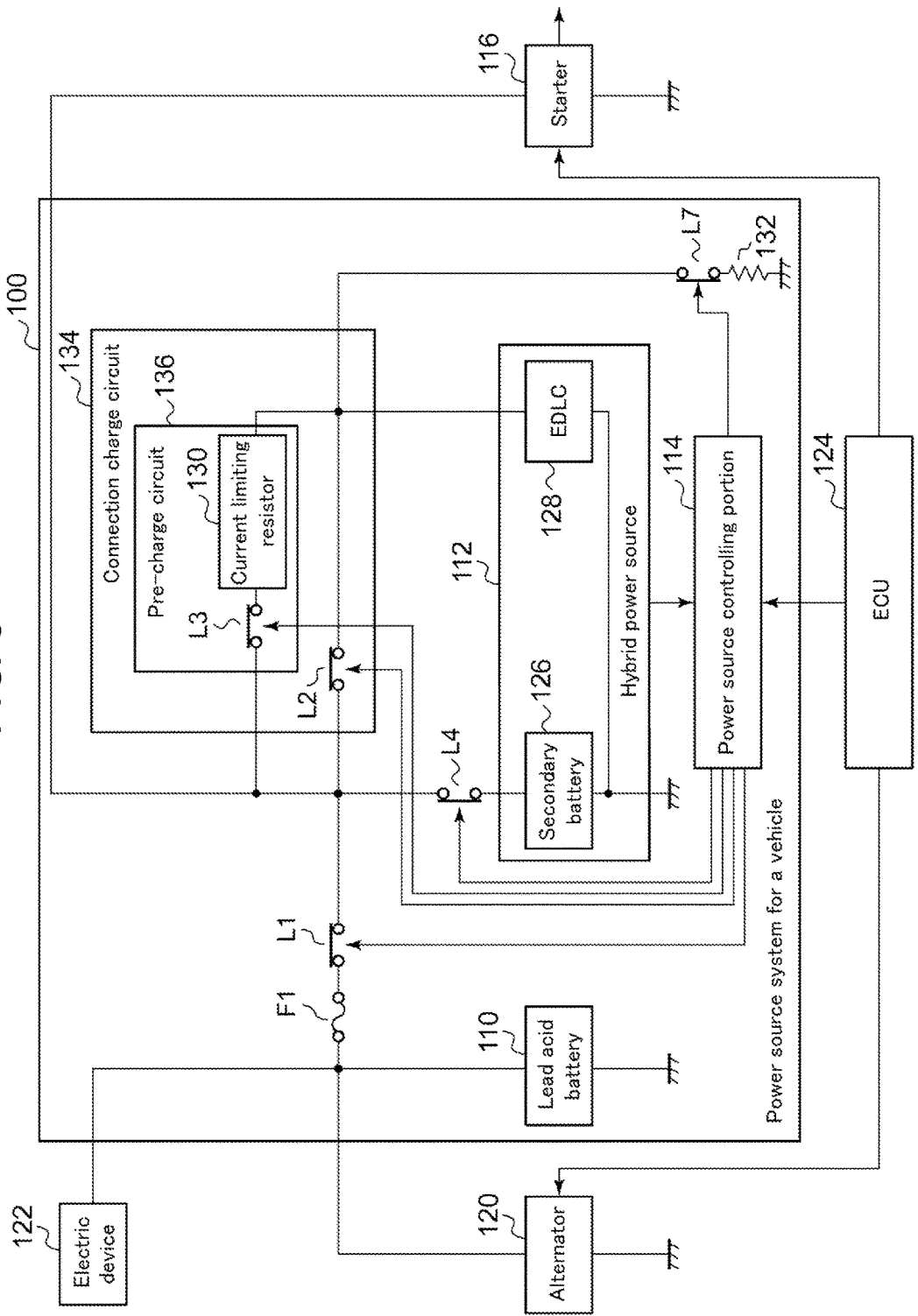
FIG. 8 is a circuit diagram showing configuration of a power source system for a vehicle related to an embodiment 2 of the present invention.

FIG. 8 shows configuration of a power source system 100 related to the embodiment 2. Fifth switch L5 is excluded from FIG. 1 in a constituent component included in power source system 100. Second switch L2 connects secondary switch 126 and EDLC 128 in parallel in the same way as the embodiment 1. Secondary battery 126 is connected to starter 116 through fourth switch L4 without through second switch L2. EDLC 128 is connected to starter 116 through second switch L2. Here, fourth switch L4 may be omitted.

As mentioned above, power source controlling portion 114 receives the signal indicating the state of power source system 100 from ECU 124. Here, the signal indicating the restart is referred as the first signal, and the signal indicating that the restart is not done by the hybrid power source 112 is referred as the second signal. Power source controlling portion 114 specifies the connecting state of first switch L1 to fourth switch L4, and seventh switch L7 corresponding to the received signal, that is, the recognized states by referring to the table. FIG. 9 shows data structure in a table stored in power source controlling portion 114. The table is shown in the same way as the embodiment 1.

Figure 10:
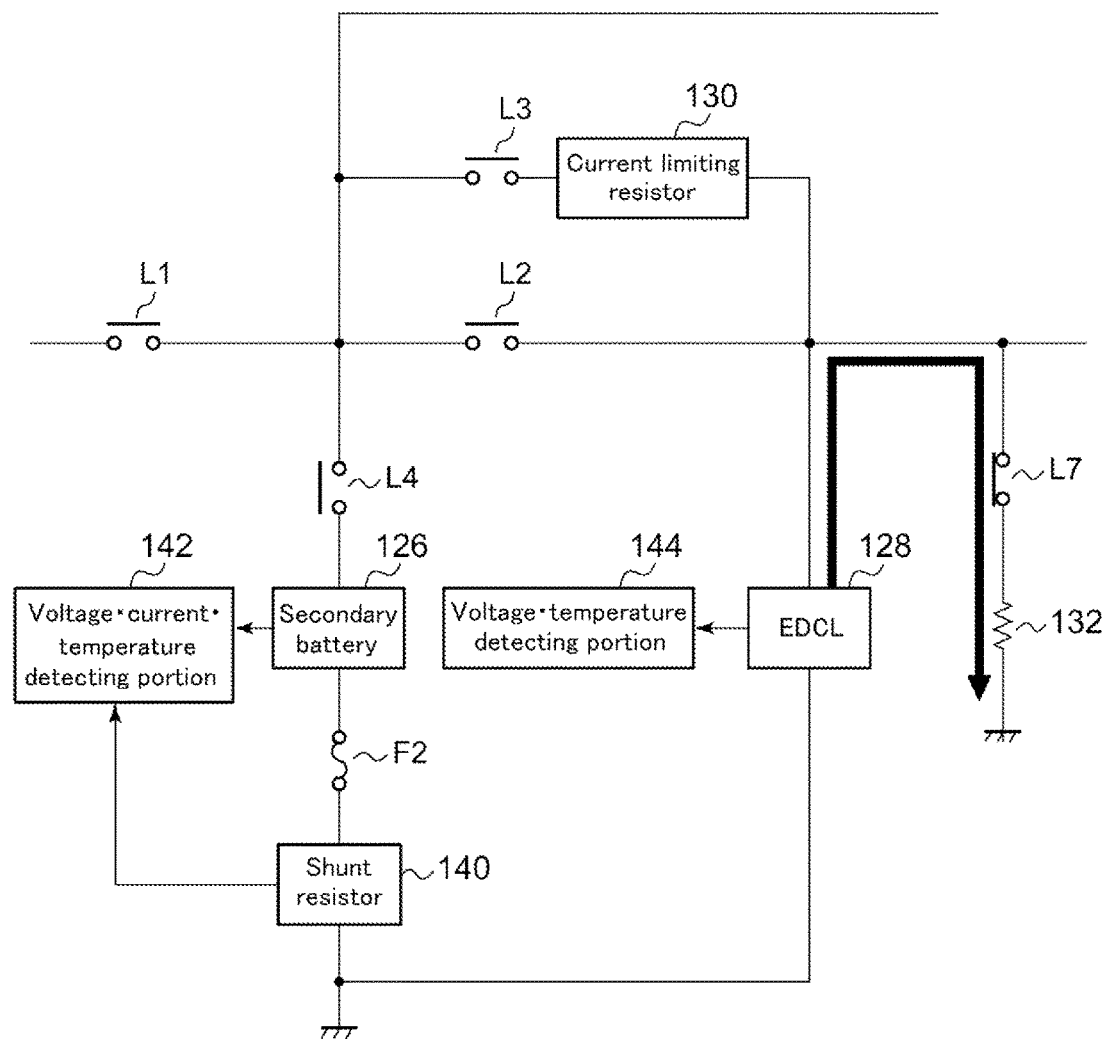
FIG. 10 is a circuit diagram showing connecting state at the time of stopping (ignition off) in the power source system for the vehicle of FIG. 8.

FIG. 10 shows connecting state at the time of stopping (ignition off) in power source system 100. In the same way as the embodiment 1, by turning on only seventh switch L7, EDLC 128 is discharged by discharge resistor 132.

Figure 11:
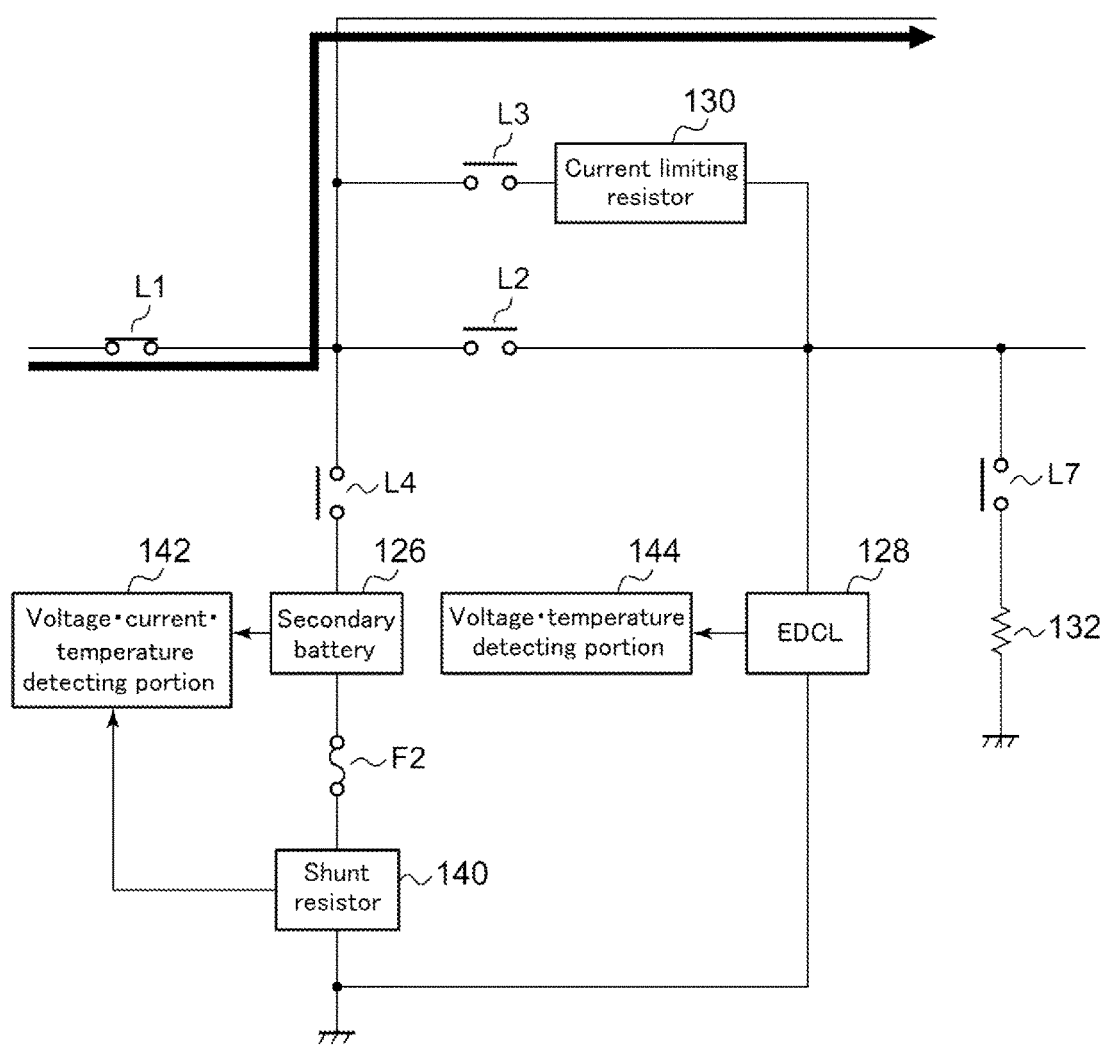
FIG. 11 is a circuit diagram showing connecting state at the time of restarting after failure of starting or restarting in the power source system for the vehicle of FIG. 8.

FIG. 11 shows connecting state at the time of starting, or restarting after failure of restarting in power source system 100. When power source controlling portion 114 receives the second signal, for example, the engine is started by tuning on the ignition switch of the vehicle, first switch L1 is turned on, and second switch L2 is turned off, and fourth switch L4 is turned off according to the table shown in FIG. 9. Further, seventh switch L7 is turned off. As a result, power is supplied from lead acid battery 110 to starter 116 through first switch L1.

Figure 12:
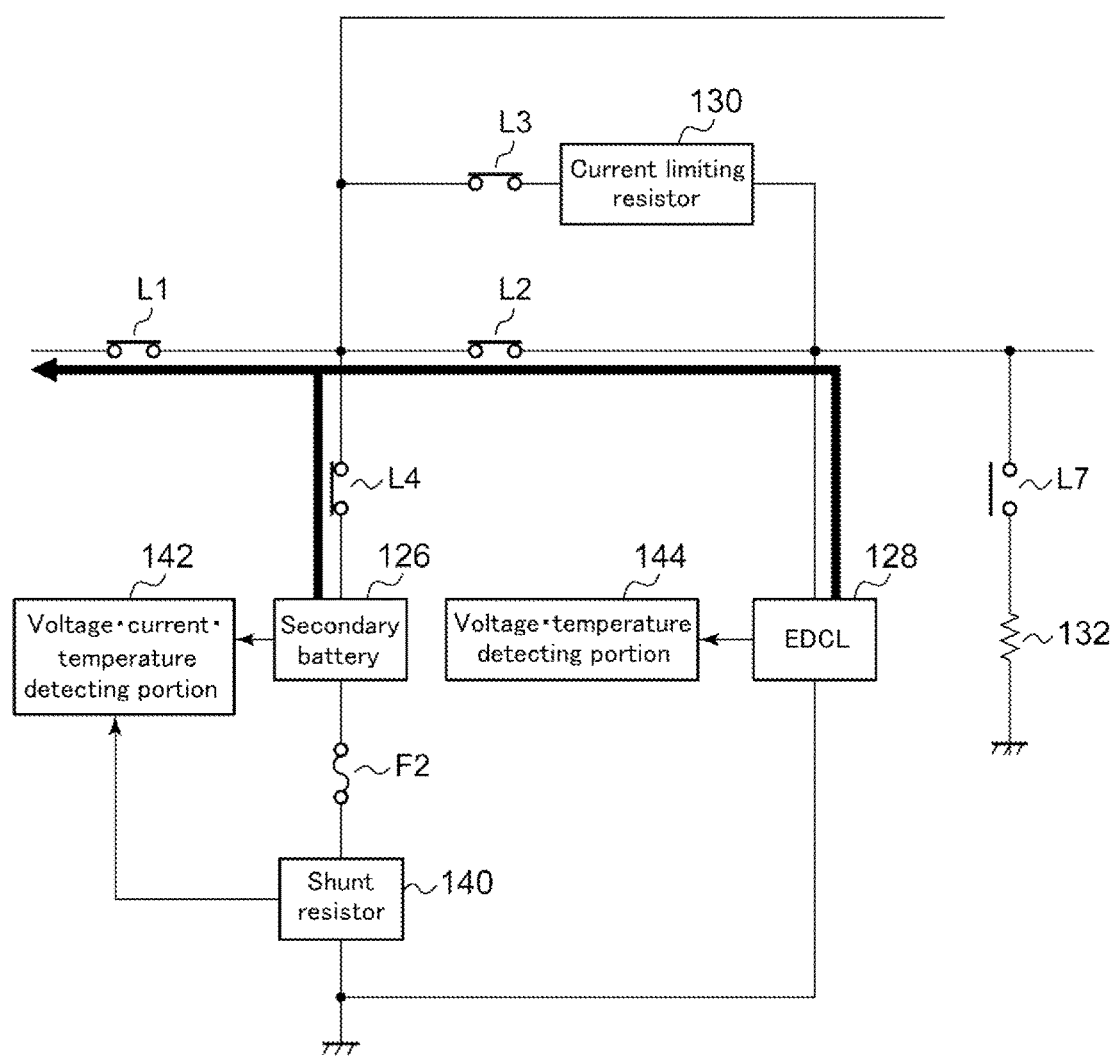
FIG. 12 is a circuit diagram showing connecting state at the normal time (alternator on) or the stopping time (ignition on) in the power source system for the vehicle of FIG. 8.

FIG. 12 shows connecting state at the normal time (alternator on) or the stopping time (ignition on) in power source system 100. According to the table shown in FIG. 9, first switch L1, second switch L2, and fourth switch L4 are turned on. Further, seventh switch L7 is turned off. As a result, power is supplied from lead acid battery 110 to electric device 122. Power is supplied from secondary battery 126 to electric device 122 through fourth switch L4 and first switch L1, and also power is supplied from EDLC 128 to electric device 122 through second switch L2 and first switch L1.

Figure 13:
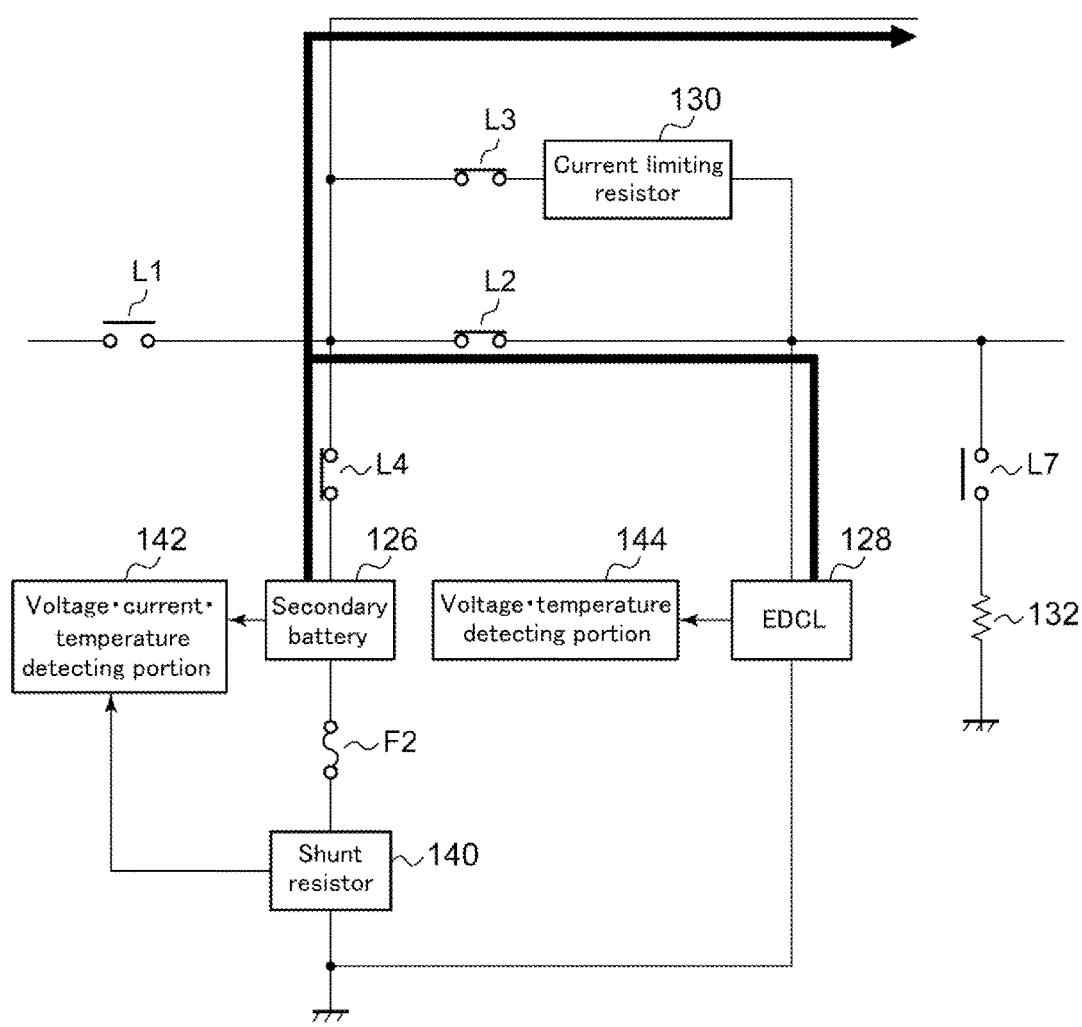
FIG. 13 is a circuit diagram showing connecting state at the time of restarting in the power source system for the vehicle of FIG. 8.

FIG. 13 shows connecting state at the time of restarting in power source system 100. When power source controlling portion 114 receives the first signal, according to the table shown in FIG. 9, first switch L1 is turned off, and second switch L2 is turned on, and the fourth switch L4 is turned on. Further, seventh switch L7 is turned off. As a result, power is supplied from secondary battery 126 to starter 116 through fourth switch L4, and also power is supplied from EDLC 128 to starter 116 through second switch L2.

In the embodiment of the present invention, as the EDLC is connected to the starter through the switch inside the power source, in a case where the lead acid battery and the starter are connected through the switch between the power sources, EDLC can be separated from current path. In the case where the lead acid battery makes the starter start in the state of EDLC being connected, EDLC is preliminarily charged or EDLC having no electric charge is connected. In these states, when the lead acid battery is connected to the starter, whether or not the starter starts is not known. Here, as the EDLC can be separated, the starter surely starts by the lead acid battery. Further, at low temperature, the starter can start. Additionally, as the second switch L2 between the secondary battery and the starter is not disposed, energy loss can be reduced.

(Embodiment 3)

Next, the embodiment 3 of the present invention is explained. The embodiment 3 is related to the power source system for the vehicle where the lead acid battery, the secondary battery, and the EDLC are connected in parallel in the same way as the above. In the above, either at the time of starting, restarting after failure of restarting, or at the normal time, first switch L1 is tuned on. Namely, the path from the lead acid battery to the starter or the electric device is one. On contrast, in the embodiment 3, at the time of starting, or restarting after failure of restarting, a bypass switch for supplying power from the lead acid battery to the starter is disposed separately. This bypass path is not used at the normal time.

Figure 14:
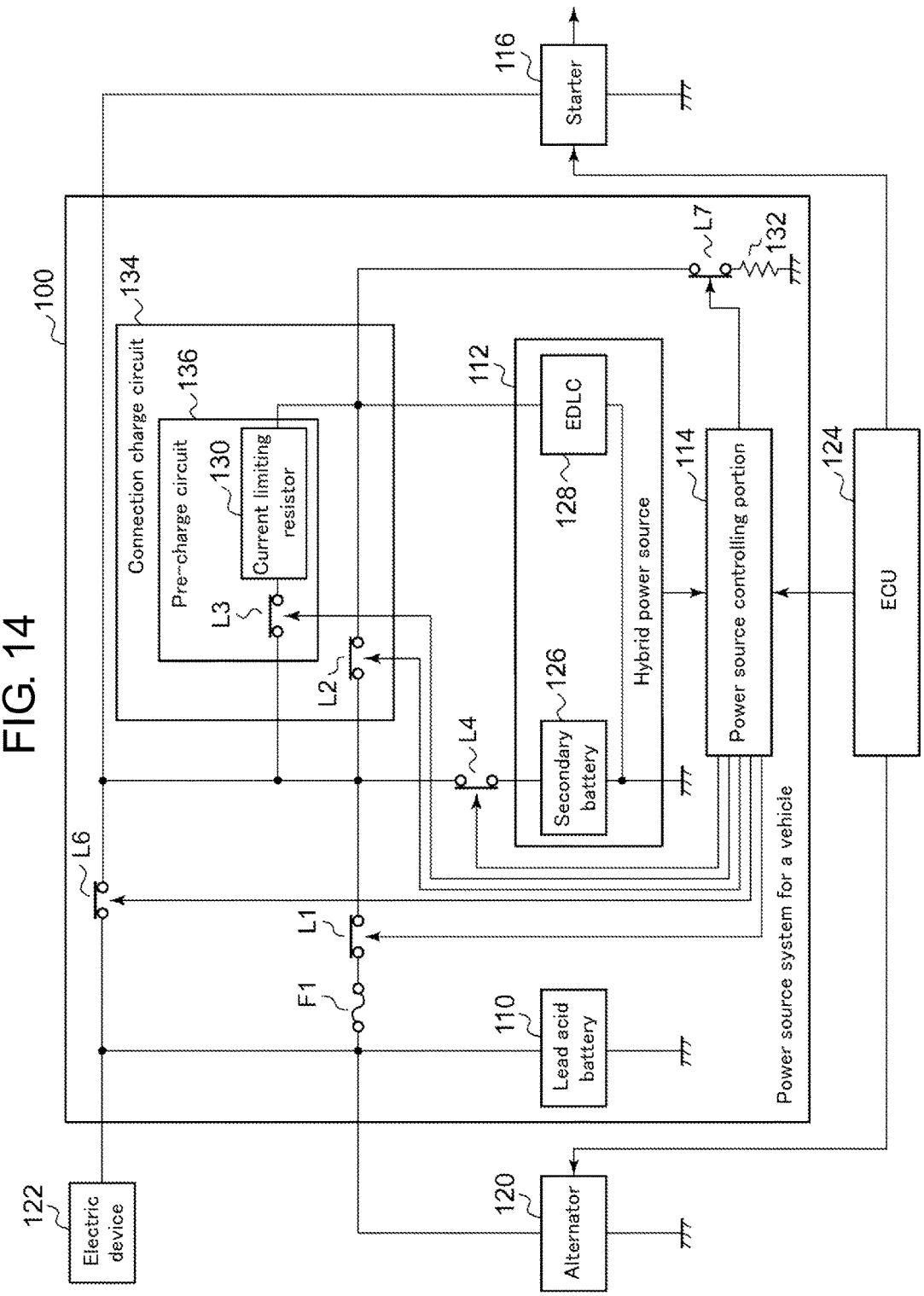
FIG. 14 is a circuit diagram showing configuration of a power source system for a vehicle related to an embodiment 3 of the present invention.

FIG. 14 shows configuration of power source system 100 related to the embodiment 3 of the present invention. Sixth switch L6 is added in a constituent component included in power source system 100, compared with constituent components shown in FIG. 8. Sixth switch L6 is called a bypass switch. Sixth switch L6 connects lead acid battery 110 and starter 116 in parallel, avoiding first switch L1 and second switch L2. The path including sixth switch L6 corresponds to the above-mentioned bypass path. Lead acid battery 110 is connected to starter 116 through sixth switch L6. Secondary battery 126 is connected to starter 116 through fourth switch L4 without through second switch L2. EDLC 128 is connected to starter 116 through second switch L2.

Power source controlling portion 114 specifies the connecting state of first switch L1 to fourth switch L4, sixth switch L6, and seventh switch L7 corresponding to the received signal, that is, the recognized states by referring to the table. FIG. 15 shows data structure in a table stored in power source controlling portion 114. In L6 column 210, the ON/OFF control of sixth switch L6 is shown.

Figure 16:
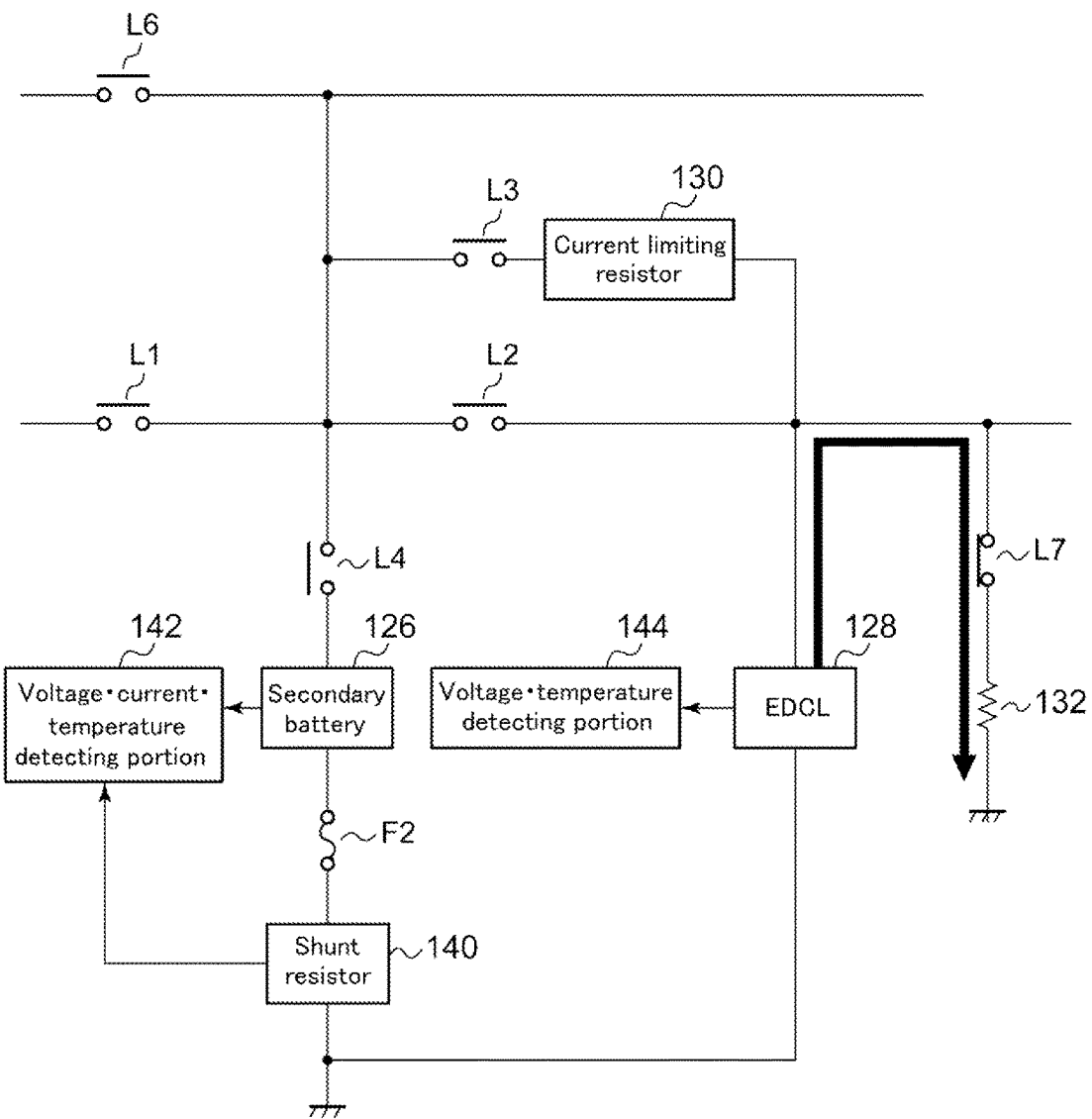
FIG. 16 is a circuit diagram showing connecting state at the time of stopping (ignition off) in the power source system for the vehicle of FIG. 14.

FIG. 16 shows connecting state at the time of stopping (ignition off) in the power source system 100. In the same way as the embodiment 1, by turning on only seventh switch L7, EDLC 128 is discharged by discharge resistor 132.

Figure 17:
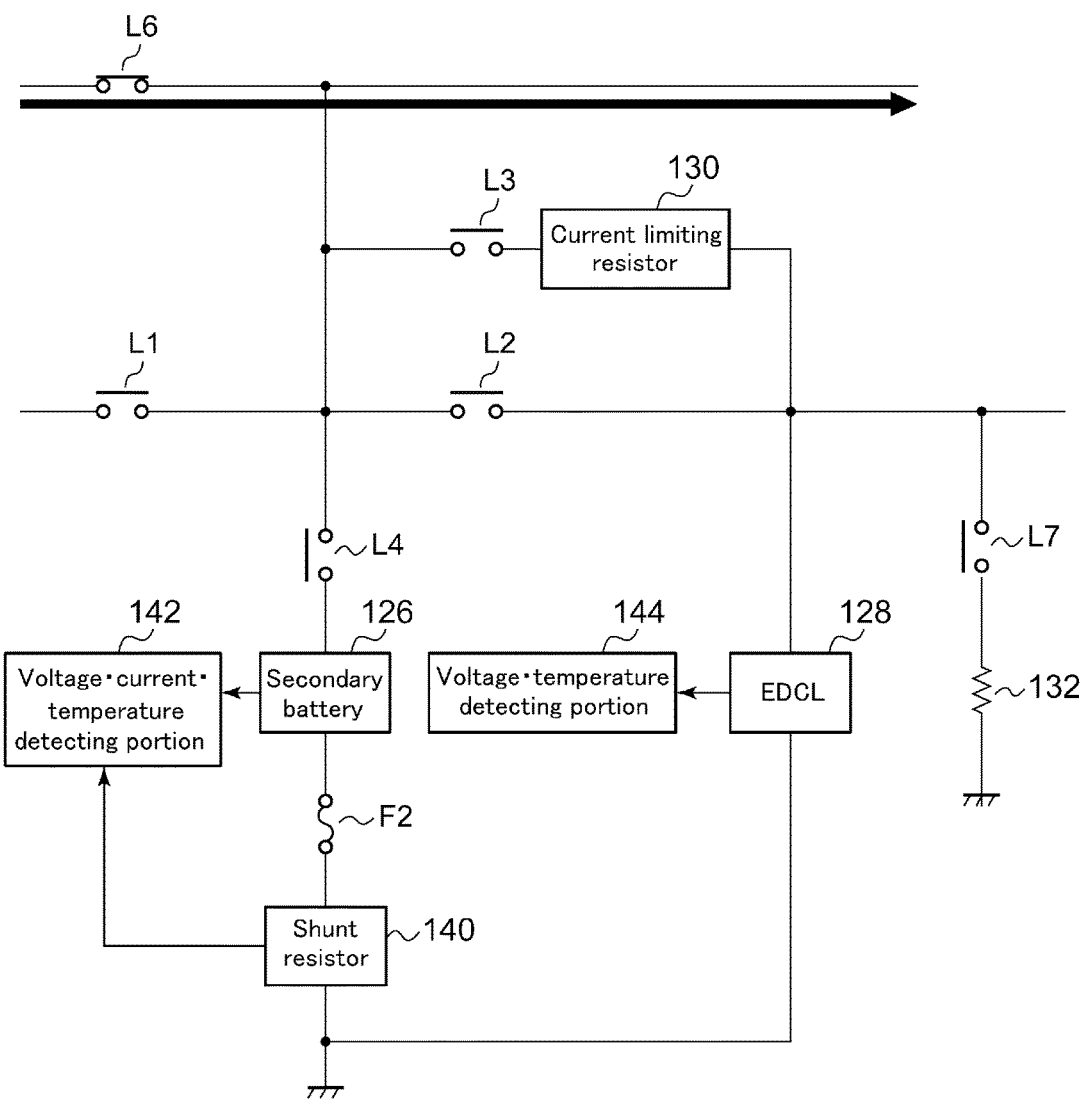
FIG. 17 is a circuit diagram showing connecting state at the time of restarting after failure of starting or restarting in the power source system for the vehicle of FIG. 14.

FIG. 17 shows connecting state at the time of starting, or restarting after failure of restarting in power source system 100. When power source controlling portion 114 receives the second signal, for example, the engine is started by tuning on the ignition switch of the vehicle, fourth switch L4 is turned off, and only sixth switch L6 is turned on, according to the table shown in FIG. 15. As a result, power is supplied from lead acid battery 110 to starter 116 through sixth switch L6.

Figure 18:
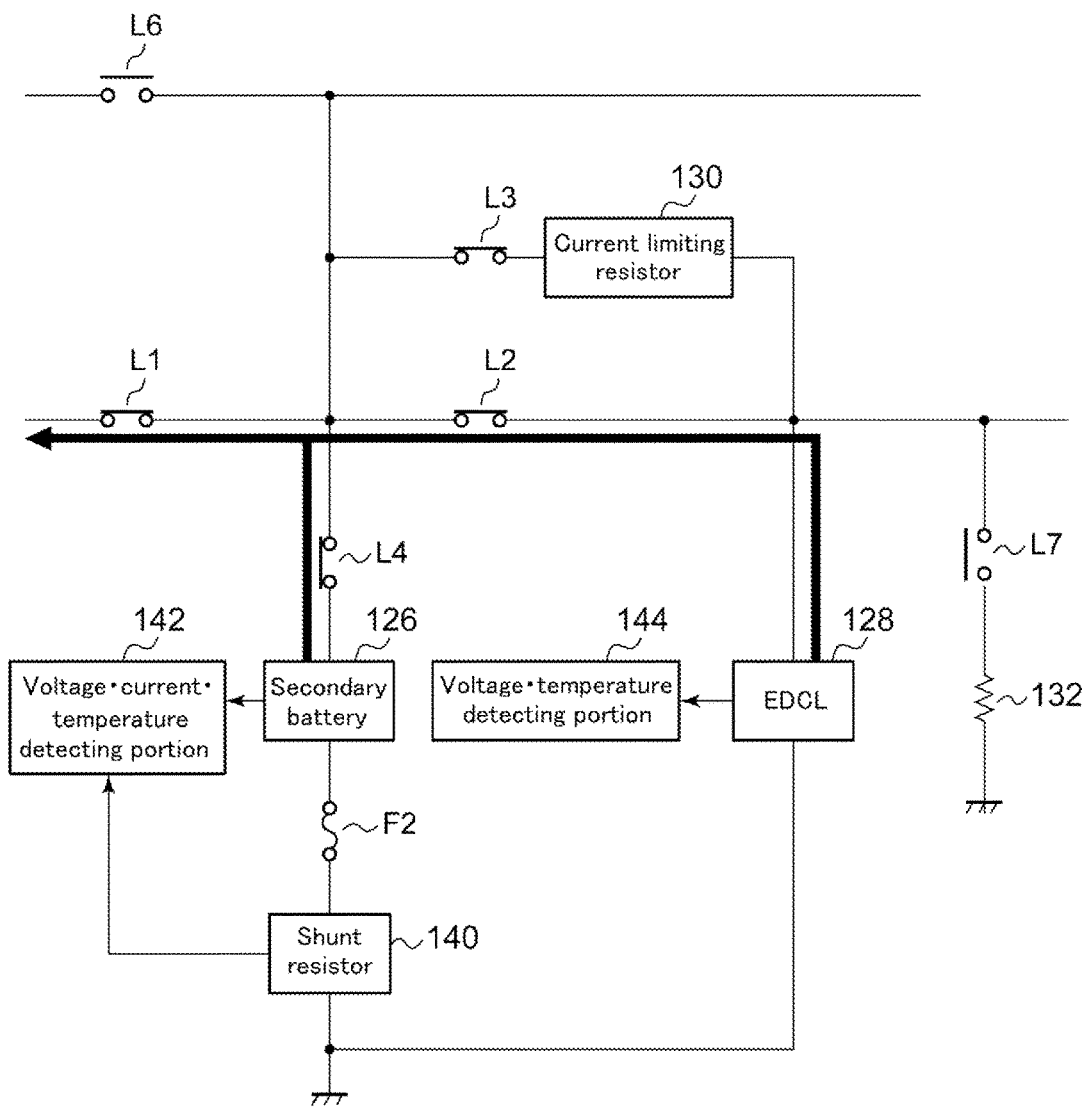
FIG. 18 is a circuit diagram showing connecting state at the normal time (alternator on) or the stopping time (ignition on) in the power source system for the vehicle of FIG. 14.

FIG. 18 shows connecting state at the normal time (alternator on) or the stopping time (ignition on) in power source system 100. According to the table shown in FIG. 15, first switch L1, second switch L2, and fourth switch L4 are turned on, and sixth switch L6 is turned off. Further, seventh switch L7 is turned off. As a result, power is supplied from lead acid battery 110 to electric device 122. Power is supplied from secondary battery 126 to electric device 122 through fourth switch L4 and first switch L1, and also power is supplied from EDLC 128 to electric device 122 through second switch L2 and first switch L1.

Figure 19:
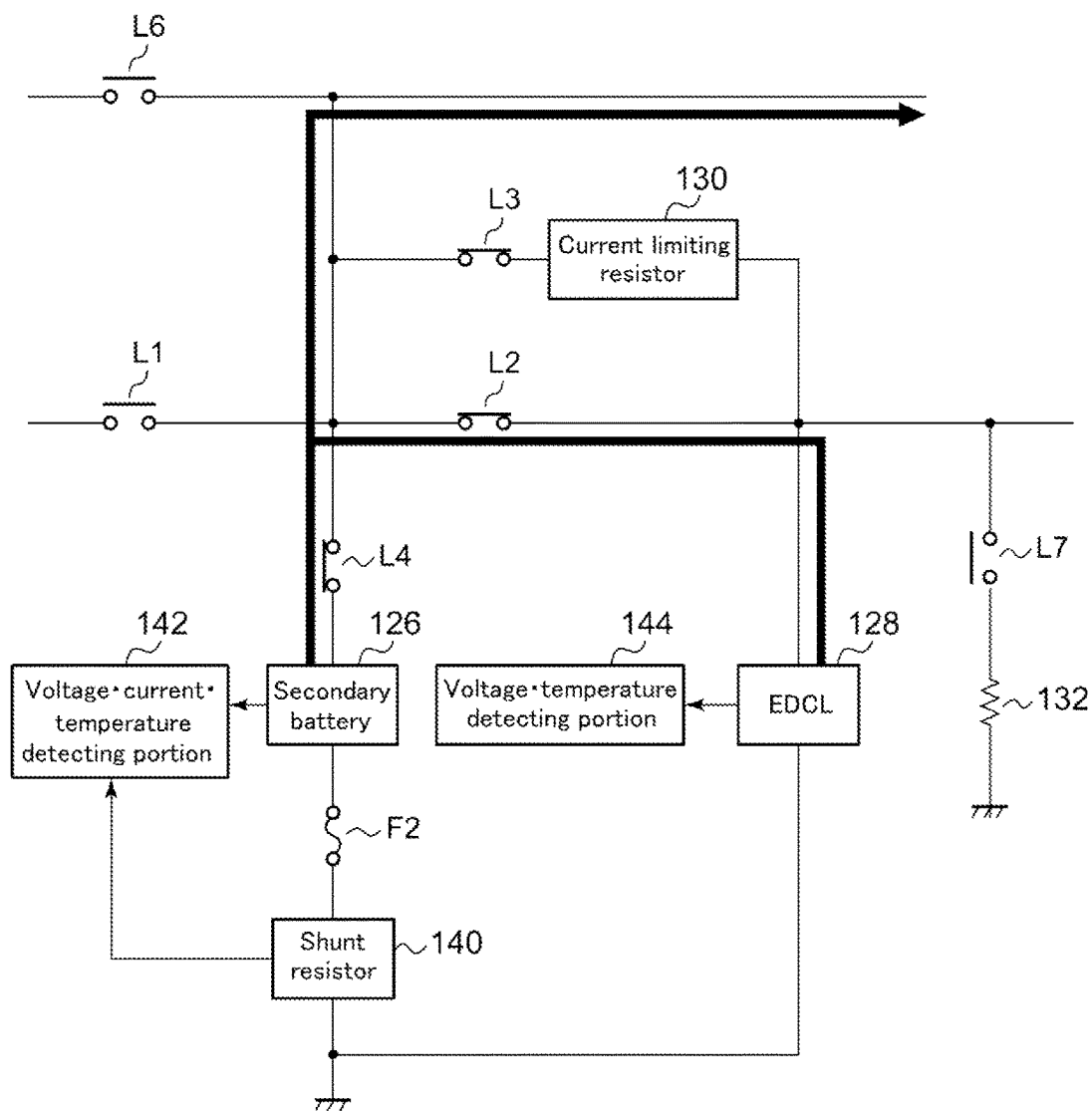
FIG. 19 is a circuit diagram showing connecting state at the time of restarting in the power source system for the vehicle of FIG. 14.

FIG. 19 shows connecting state at the time of restarting in power source system 100. When power source controlling portion 114 receives the first signal, according to the table shown in FIG. 15, first switch L1 is turned off, and second switch L2 is turned on, and the fourth switch L4 is turned on, and sixth switch L6 is turned off. Further, seventh switch L7 is turned off. As a result, power is supplied from secondary battery 126 to starter 116 through fourth switch L4, and also power is supplied from EDLC 128 to starter 116 through second switch L2.

In the embodiment of the present invention, as the bypass path which connects the lead acid battery and the starter directly is provided, when the engine cannot restart due to abnormal state of the hybrid power source, power is supplied from the lead acid battery to the starter. As power is supplied from the lead acid battery to the starter, reliability can be improved more. The bypass path is provided separately from the path where the switch between the power sources is disposed, even though the switch between the power sources is broken, power can be supplied from the lead acid battery to the starter. Further, when the engine starts by turning on the ignition switch of the vehicle, the bypass switch is turned on, and also the switch between the power sources is turned off. Therefore, even at low temperature, power can be supplied to the starter.

(Embodiment 4)

Next, the embodiment 4 of the present invention is explained. The embodiment 4 is related to the power source system for the vehicle where the lead acid battery, the secondary battery, and the EDLC are connected in parallel in the same way as the above. The embodiment 4 has the bypass path in the same way as the embodiment 3. In the embodiment 3, the secondary battery is connected to the starter without through the second switch, but in the embodiment 4, the EDLC is connected to the starter without through the second switch. This corresponds to the configuration that the bypass path is added in the embodiment 1.

Figure 20:
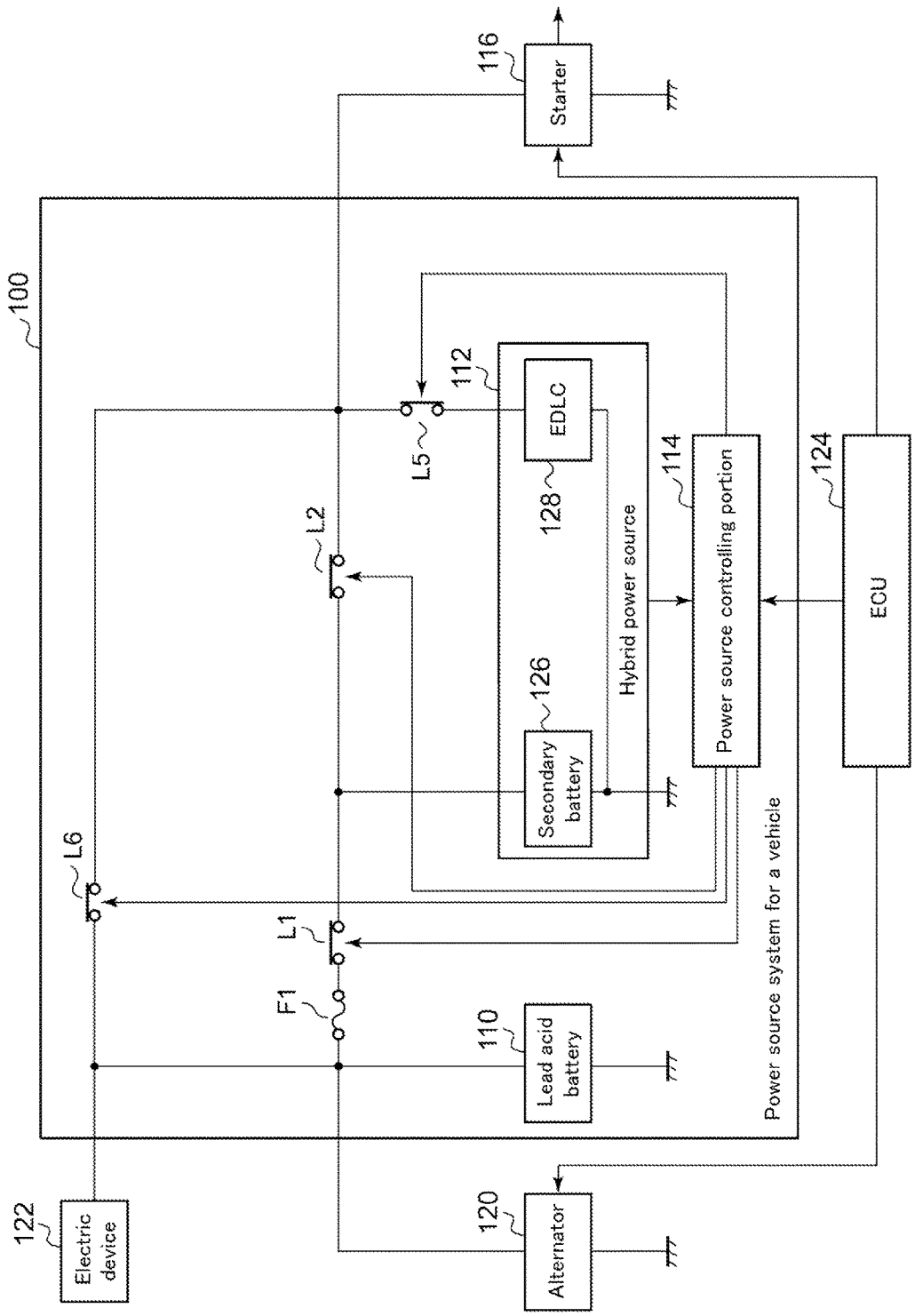
FIG. 20 is a circuit diagram showing configuration of a power source system for a vehicle related to an embodiment 4 of the present invention.

FIG. 20 shows configuration of power source system 100 related to the embodiment 4 of the present invention. Sixth switch L6 is added in a constituent component included in power source system 100, compared with constituent components shown in FIG. 1, but pre-charge circuit 136, fourth switch L4, seventh switch L7, and discharge resistor 132 are excluded. However, these constituent components may be added. Lead acid battery 110 is connected to starter 116 through sixth switch 6. Secondary battery 126 is connected to starter 116 through second switch L2. EDLC 128 is connected to starter 116 through fifth switch L5.

Power source controlling portion 114 specifies the connecting state of first switch L1, second switch L2, fifth switch L5, and sixth switch L6 corresponding to the received signal, that is, the recognized states by referring to the table.

FIG. 21 shows data structure in a table stored in power source controlling portion 114. The table is shown in the same way as the above.

Figure 22:
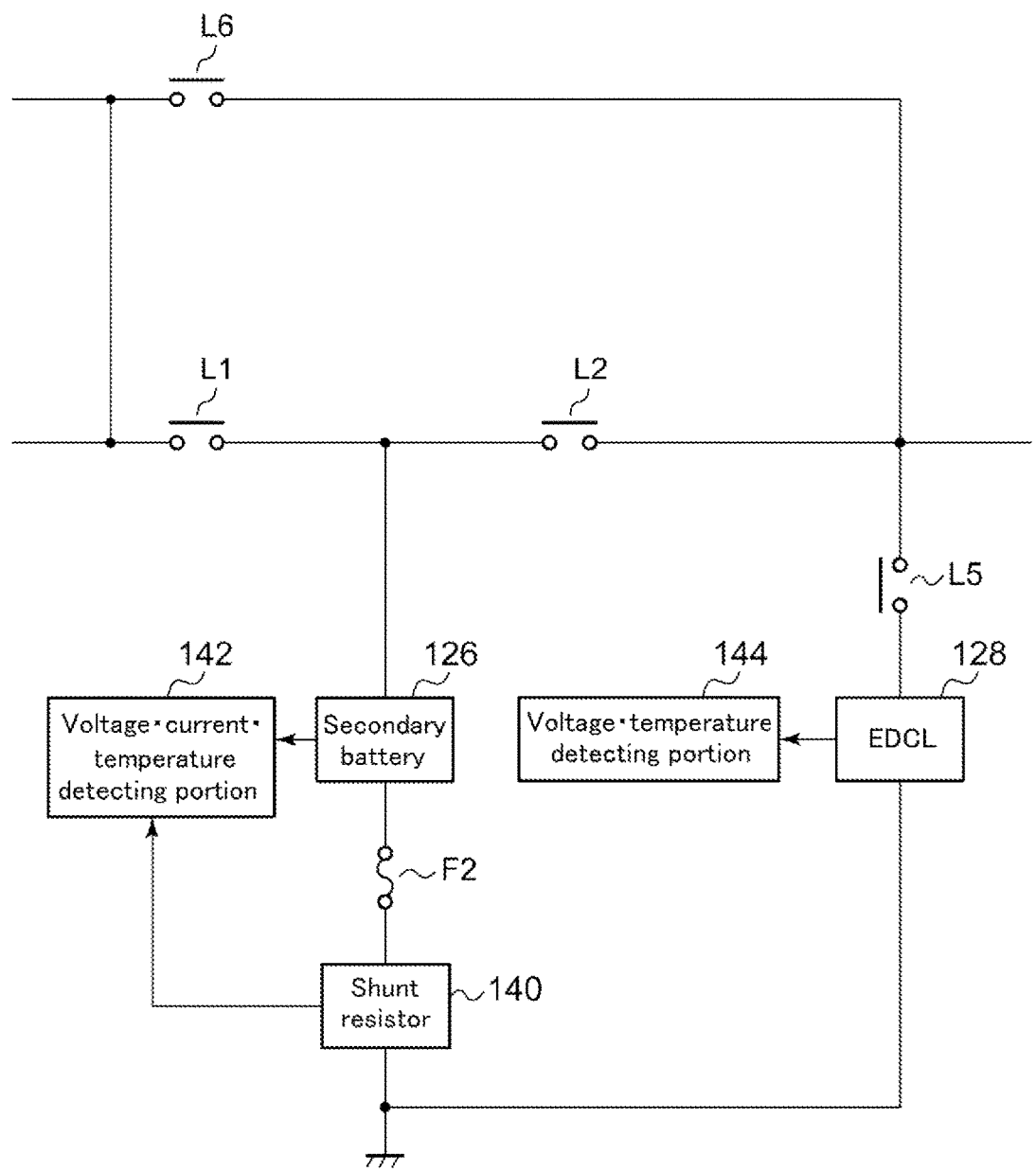
FIG. 22 is a circuit diagram showing connecting state at the time of stopping (ignition off) in the power source system for the vehicle of FIG. 20.

FIG. 22 shows connecting state at the time of stopping (ignition off) in power source system 100. As shown in the figure, first switch L1, second switch L2, fifth switch L5, and sixth switch L6 are turned off.

Figure 23:
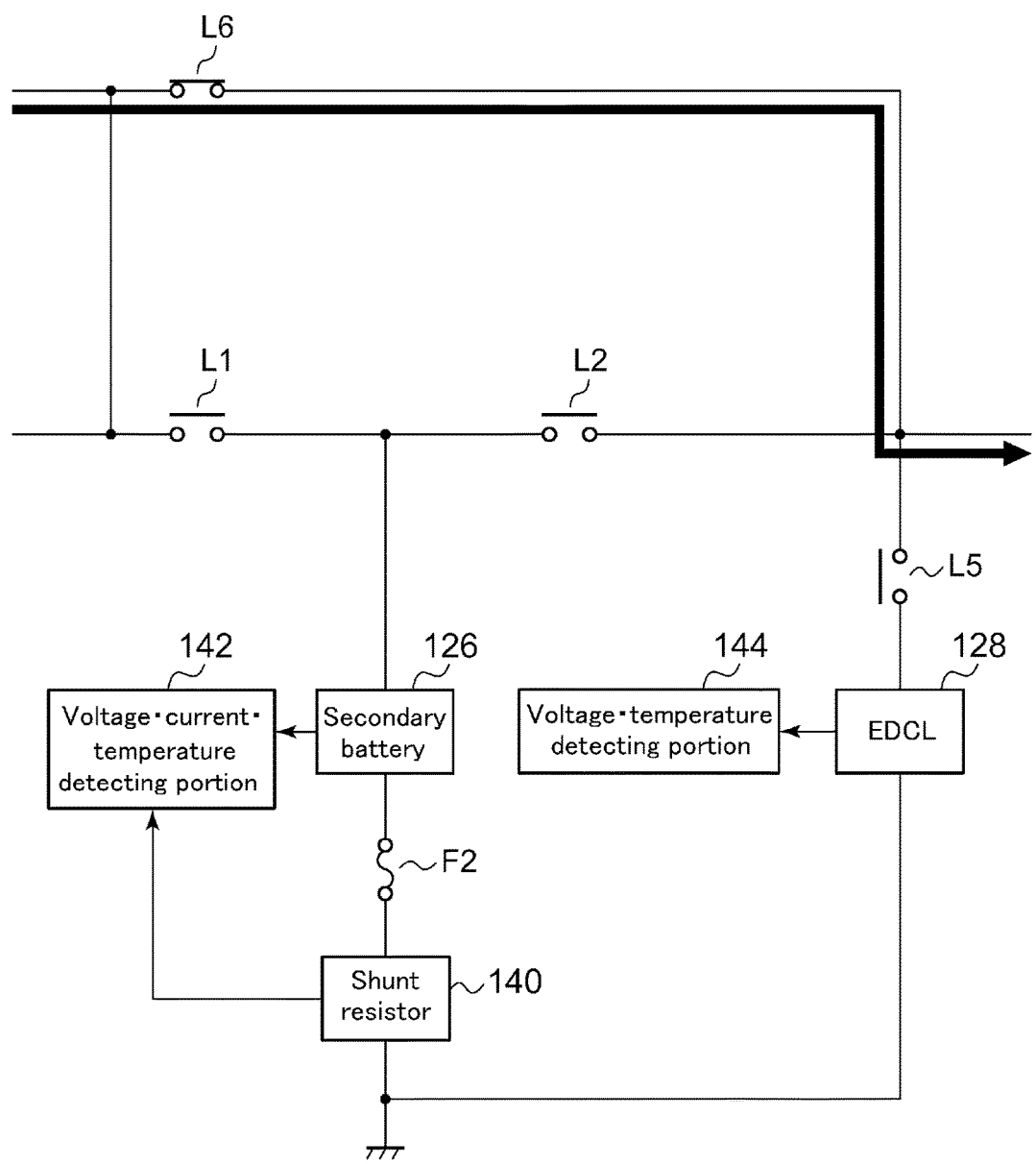
FIG. 23 is a circuit diagram showing connecting state at the time of restarting after failure of starting or restarting in the power source system for the vehicle of FIG. 20.

FIG. 23 shows connecting state at the time of starting, or restarting after failure of restarting in power source system 100. When power source controlling portion 114 receives the second signal, first switch L1, second switch L2, fifth switch L5 are turned off, and only sixth switch L6 is turned on, according to the table shown in FIG. 21. As a result, power is supplied from lead acid battery 110 to starter 116 through sixth switch L6.

Figure 24:
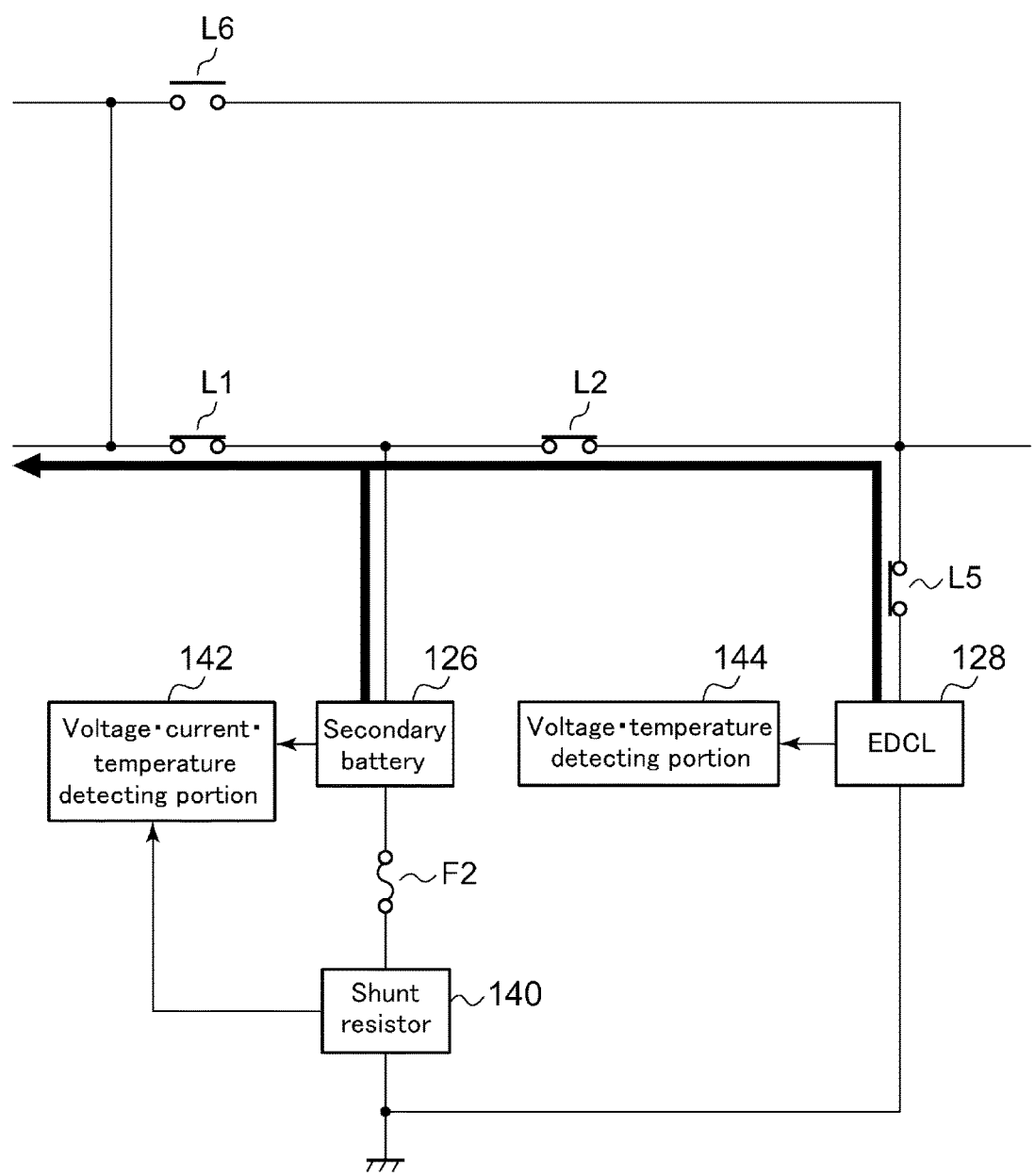
FIG. 24 is a circuit diagram showing connecting state at the normal time (alternator on) or the stopping time (ignition on) in the power source system for the vehicle of FIG. 20.

FIG. 24 shows connecting state at the normal time (alternator on) or the stopping time (ignition on) in power source system 100. According to the table shown in FIG. 21, first switch L1, second switch L2, and fifth switch L5 are turned on, and sixth switch L6 is turned off. As a result, power is supplied from lead acid battery 110 to electric device 122. Power is supplied from secondary battery 126 to electric device 122 through first switch L1, and also power is supplied from EDLC 128 to electric device 122 through fifth switch L5, second switch L2, and first switch L1.

Figure 25:
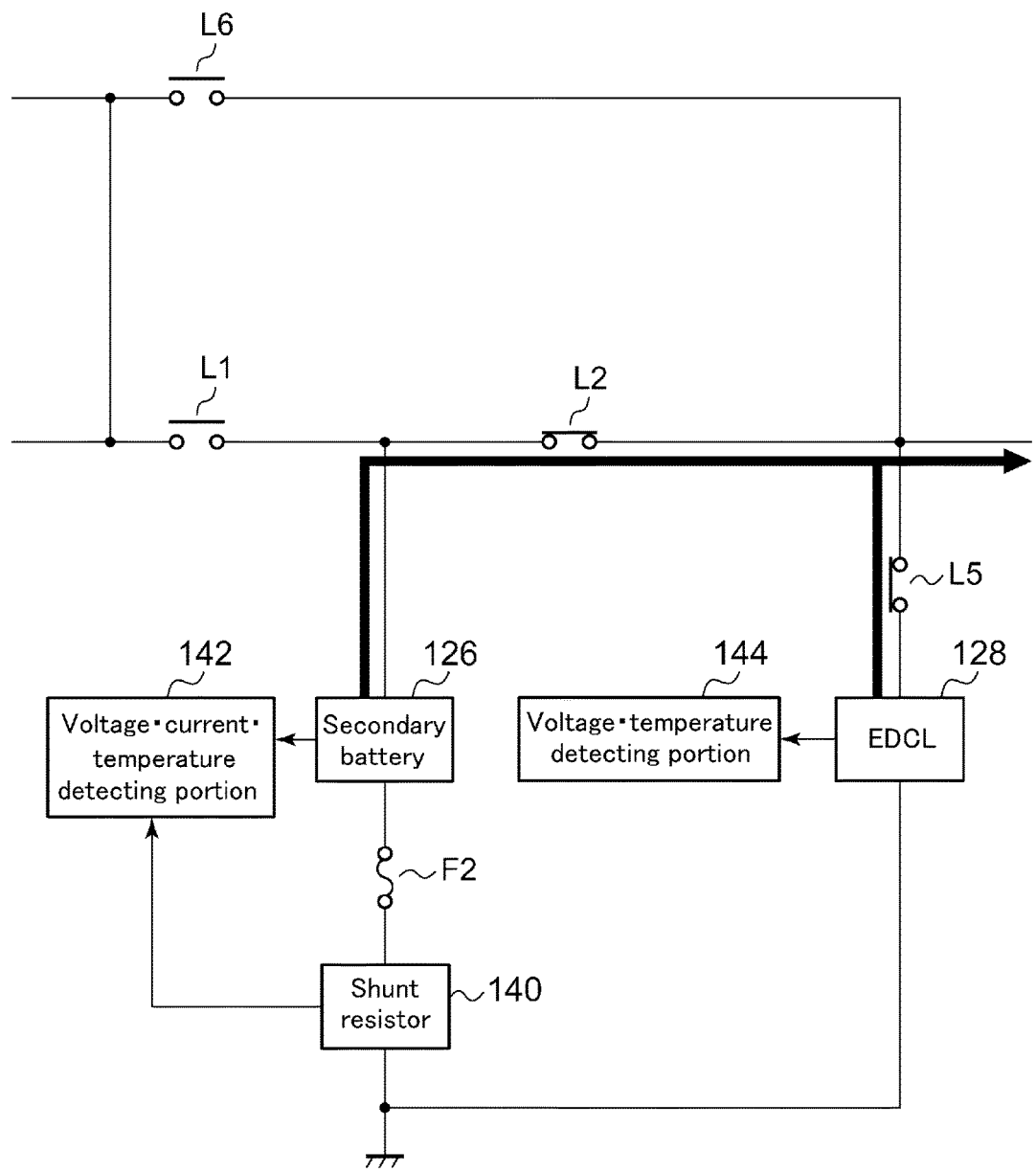
FIG. 25 is a circuit diagram showing connecting state at the time of restarting in the power source system for the vehicle of FIG. 20.

FIG. 25 shows connecting state at the time of restarting in power source system 100. When power source controlling portion 114 receives the first signal, according to the table shown in FIG. 21, first switch L1 is turned off, and second switch L2 and fifth switch L5 are turned on, and sixth switch L6 is turned off. As a result, power is supplied from secondary battery 126 to starter 116 through second switch L2, and also power is supplied from EDLC 128 to starter 116 through fifth switch L5.

In the embodiment of the present invention, as the bypass path which connects the lead acid battery and the starter directly is provided, when the engine cannot restart due to abnormal state of the hybrid power source, power is supplied from the lead acid battery to the starter. As power is supplied from the lead acid battery to the starter, reliability can be improved more. The bypass path is provided separately from the path where the switch between the power sources is disposed, even though the switch between the power sources is broken, power can be supplied from the lead acid battery to the starter. Further, when the engine starts by turning on the ignition switch of the vehicle, the bypass switch is turned on, and also the switch between the power sources is turned off. Therefore, even at low temperature, power can be supplied to the starter.

The above explanation is made based on the embodiments of the present invention. The person of the ordinary skill in the art can understand that these embodiments are illustrated, and these constitution elements and these combined processes can be modified, and such modified examples are covered by the scope of the present invention.

In the embodiments 1 to 3 of the present invention, fourth switch L4 is connected to secondary battery 126. However, for example, fourth switch L4 can be omitted. In this modified example, configuration of power source system 100 can be simplified.

In the embodiments 1 to 3 of the present invention, first fuse F1 and second fuse F2 are connected. However, for example, at least one of first fuse F1 and second fuse F2 can be omitted. In this modified example, configuration of power source system 100 can be simplified.

The invention claimed is:

1. A power source system for a vehicle comprising:
   a lead acid battery;
   a hybrid power source connecting a secondary battery except for the lead acid battery and a capacitor in parallel;
   a switch between power sources connecting the hybrid power source and the lead acid battery in parallel;
   a power source controlling portion for controlling power supply to and charging the hybrid power source and the lead acid battery; and
   a switch inside the power source for connecting the secondary battery and the capacitor in parallel,
   wherein the hybrid power source is connected to a starter for starting an engine for the vehicle, and also connected to a general load except for the starter through the switch between the power sources,
   the lead acid battery is connected to the general load, and also connected to the starter through the switch between the power sources,
   the secondary battery is connected to the starter,
   the capacitor is connected to the starter through the switch inside the power source, and
   the secondary battery is connected to the switch between the power sources.

2. The power source system for the vehicle according to claim 1,
   wherein in a case where the engine restarts, the power source controlling portion turns off the switch between the power sources.

3. The power source system for the vehicle according to claim 1,
   wherein in a case where a restart of the engine is not done by the hybrid power source, the power source controlling portion is supplied from the lead acid battery to the starter.

4. The power source system for the vehicle according to claim 1,
   further comprising a secondary battery connection switch, one end of the secondary battery connection switch connected to the secondary battery, and another end of the secondary battery connection switch connected to the starter, the switch between the power sources, and the switch inside the power source.

5. The power source system for the vehicle according to claim 1,
   further comprising a bypass switch for bypassing the switch between the power sources and the switch inside the power source, and connecting the lead acid battery and the starter.

6. The power source system for the vehicle according to claim 5,
   further comprising a secondary battery connection switch one end of the secondary battery connection switch connected to the secondary battery, and another end of the secondary battery connection switch connected to the starter, the switch between the power sources, and the switch inside the power source.

7. The power source system for the vehicle according to claim 5,
   further comprising a capacity connection switch, one end of the capacity connection switch connected to the capacity, and another end of the capacity connection switch connected to the starter, the switch inside the power source, and the bypass switch.

8. The power source system for the vehicle according to claim 1,
   further comprising a pre-charge circuit connected in parallel to the switch inside the power source,
   wherein in a current limiting mode for limiting a parallel current between the secondary battery and the capacitor, the power source controlling portion turns off the switch inside the power source, and turns on the pre-charge circuit, and
   in a large current mode for allowing the parallel current larger than that of the current limiting mode, the power source controlling portion turns on the switch inside the power source, and turns off or on the pre-charge circuit.

9. The power source system for the vehicle according to claim 1,
   further comprising a discharge switch connected in parallel to the capacitor.

10. A power source system for a vehicle comprising:
    a lead acid battery;
    a hybrid power source connecting a secondary battery except for the lead acid battery and a capacitor in parallel;
    a switch between power sources connecting the hybrid power source and the lead acid battery in parallel;
    a power source controlling portion for controlling power supply to and charging the hybrid power source and the lead acid battery; and
    a switch inside the power source for connecting the secondary battery and the capacitor in parallel,
    wherein the hybrid power source is connected to a starter for starting an engine for the vehicle, and also connected to a general load except for the starter through the switch between the power sources,
    the lead acid battery is connected to the general load, and also connected to the starter through the switch between the power sources,
    the secondary battery is connected to the starter through the switch inside the power source, and
    the lead acid battery is connected to the starter through the switch inside the power source and the switch between the power sources.

11. The power source system for the vehicle according to claim 10,
    wherein in a case where the engine starts by turning on an ignition switch of the vehicle, the power source controlling portion turns on the switch between the power sources.

12. The power source system for the vehicle according to claim 10,
    further comprising a secondary battery connection switch, one end of the secondary battery connection switch connected to the secondary battery, and another end of the secondary battery connection switch connected to the starter, the switch between the power sources, and the switch inside the power source.

13. The power source system for the vehicle according to claim 10,
    further comprising a bypass switch for bypassing the switch between the power sources and the switch inside the power source, and connecting the lead acid battery and the starter.

14. The power source system for the vehicle according to claim 13,
    further comprising a secondary battery connection switch, one end of the secondary battery connection switch connected to the secondary battery, and another end of the secondary battery connection switch connected to the switch between the power sources and the switch inside the power source.

15. The power source system for the vehicle according to claim 13,
further comprising a capacity connection switch, one end of the capacity connection switch connected to the capacity, and another end of the capacity connection switch connected to the starter, the switch inside the power source, and the bypass switch.

16. The power source system for the vehicle according to claim 13,
wherein in a case where the engine restarts by turning on an ignition switch of the vehicle, the power source controlling portion turns on the bypass switch, and turns off the switch between the power sources and the switch inside the power source.

17. The power source system for the vehicle according to claim 10,
further comprising a pre-charge circuit connected in parallel to the switch inside the power source,
wherein in a current limiting mode for limiting a parallel current between the secondary battery and the capacitor, the power source controlling portion turns off the switch inside the power source, and turns on the pre-charge circuit, and
in a large current mode for allowing the parallel current larger than that of the current limiting mode, the power source controlling portion turns on the switch inside the power source, and turns off or on the pre-charge circuit.

18. The power source system for the vehicle according to claim 17,
wherein selecting the current limiting mode or the large current mode corresponding to a voltage of the secondary battery and a voltage of the capacitor, the power source controlling portion charges the capacitor with a storage energy of the secondary battery.

19. The power source system for the vehicle according to claim 10,
further comprising a discharge switch connected in parallel to the capacitor.

* * * * *